(12) United States Patent
Ohsawa

(10) Patent No.: US 9,278,508 B2
(45) Date of Patent: Mar. 8, 2016

(54) FILM TRANSFER APPARATUS

(71) Applicant: Shin Ohsawa, Ibaraki (JP)

(72) Inventor: Shin Ohsawa, Ibaraki (JP)

(73) Assignee: KOMORI CORPORATION, Tokyo (JP)

(*) Notice: Subject to any disclaimer, the term of this patent is extended or adjusted under 35 U.S.C. 154(b) by 682 days.

(21) Appl. No.: 13/645,300

(22) Filed: Oct. 4, 2012

(65) Prior Publication Data

US 2013/0087290 A1   Apr. 11, 2013

(30) Foreign Application Priority Data

Oct. 7, 2011 (JP) .................................. 2011-222564
Oct. 7, 2011 (JP) .................................. 2011-222565
Nov. 9, 2011 (JP) .................................. 2011-245506

(51) Int. Cl.
| | |
|---|---|
| B32B 38/18 | (2006.01) |
| B32B 37/00 | (2006.01) |
| B32B 41/00 | (2006.01) |
| B41F 16/00 | (2006.01) |
| B65H 20/32 | (2006.01) |

(52) U.S. Cl.
CPC ......... *B32B 37/0046* (2013.01); *B32B 38/1825* (2013.01); *B32B 41/00* (2013.01); *B41F 16/006* (2013.01); *B41F 16/0033* (2013.01); *B65H 20/32* (2013.01); *B65H 2408/215* (2013.01); *Y10T 156/17* (2015.01)

(58) Field of Classification Search
CPC .. B65H 20/10; B65H 20/32; B65H 2408/215; B65H 23/042; Y10S 101/42
See application file for complete search history.

(56) References Cited

U.S. PATENT DOCUMENTS

| | | | | |
|---|---|---|---|---|
| 3,203,607 A | * | 8/1965 | Mason ........................ | 226/118.5 |
| 3,648,134 A | * | 3/1972 | Audeh et al. ................. | 318/6 |
| 3,713,606 A | * | 1/1973 | Van Pelt et al. ............. | 242/331.2 |
| 3,809,328 A | * | 5/1974 | Cope et al. ................. | 242/331.2 |
| 3,826,446 A | * | 7/1974 | Jones ......................... | 242/331.3 |
| 6,230,616 B1 | | 5/2001 | Steuer | |
| 2008/0295969 A1 | * | 12/2008 | Ohsawa ........................ | 156/540 |
| 2009/0078137 A1 | | 3/2009 | Yamashita et al. | |
| 2009/0078141 A1 | | 3/2009 | Yamashita et al. | |
| 2011/0048646 A1 | * | 3/2011 | Ohsawa ........................ | 156/387 |

FOREIGN PATENT DOCUMENTS

| | | |
|---|---|---|
| CN | 101391511 | 3/2009 |
| CN | 101391512 | 3/2009 |
| CN | 101665194 | 3/2010 |
| EP | 0 858 888 A2 | 8/1998 |
| EP | 1975101 | 3/2008 |
| EP | 2161130 | 8/2009 |
| JP | 2006-315229 A | 11/2006 |
| JP | 2008-296448 A | 12/2008 |
| WO | WO 2008/077496 A2 | 7/2008 |
| WO | WO 2010/072538 | 7/2010 |

* cited by examiner

*Primary Examiner* — Mark A Osele
(74) *Attorney, Agent, or Firm* — Blakely Sokoloff Taylor & Zafman LLP

(57) ABSTRACT

A film storage unit is disposed vertically above a film transfer cylinder, and an unwinder device and a rewinder device are disposed vertically above the film storage unit. The unwinder device and rewinder device are vertically aligned with each other. With this arrangement, a large-diameter unwinding reel and a rewinding reel can be mounted in the unwinder device and rewinder device, respectively, from above a foil transfer unit. Also, given operation spaces can be ensured on the front and rear sides of the unwinder device and rewinder device.

14 Claims, 15 Drawing Sheets

FILM TRANSFER APPARATUS

BACKGROUND OF THE INVENTION

The present invention relates to a film transfer apparatus which processes a sheet using a film.

Some types of film transfer apparatuses employ a cast curing technique called Cast & Cure or a technique called cold foiling. These techniques produce a good aesthetic effect on sheets. In the Cast & Cure technique, a film having undergone hologram embossing is cured while being in press contact with the surface of a sheet coated with a UV (ultraviolet) curing resin, thereby producing, for example, a hologram effect by casting. Also, in the cold foiling technique, a film having foil deposited on it is brought into press contact with the surface of a sheet having an adhesive printed on it, thereby transferring the foil onto the sheet. An improvement in performance of such a film transfer apparatus which produces a good aesthetic effect on a print product is actively in progress.

Japanese Patent Laid-Open No. 2008-296448 (patent literature 1), for example, proposes an apparatus capable of performing cold foiling (cold foil transfer) on a sheet and embossing while printing on the sheet.

Also, Japanese Patent Laid-Open No. 2006-315229 (patent literature 2) proposes an apparatus capable of printing on a sheet, and performing, for example, LC coating or hologram embossing called TRANS TUVC using the Cast & Cure technique of transferring the pattern of a film on a varnished surface.

In winding a film to finish an unwinding reel used in the film transfer apparatus, and further storing and transporting the unwinding reel in the physical distribution process, the unwinding reel may have a non-circular shape due to an eccentricity or deformation with respect to a perfect circle. Therefore, even when such an unwinding reel is set in an unwinder device (unwinding device) in the film transfer apparatus, and rotated at a speed corresponding to the sheet conveyance speed, the feed speed of the film unwound from the unwinding reel varies, so an error occurs as the film feed speed is not always equal to the sheet conveyance speed.

When a low-inertia unwinding reel is rotated at low speed to unreel a film, the error between the film feed speed and the sheet conveyance speed can be controlled small. However, if an unwinding reel has a larger diameter or width, its inertia has a considerable influence on the error, so rotation control by the unwinder device weakens due to a flywheel effect, thus making it difficult to reduce the error by this control. Furthermore, as the feed speed at which the unwinder device unreels a film rises, the performance limit of weak rotation control by the unwinder device has a more considerable influence on the error.

At the point of application (nip) of pressing upon transfer between a film transfer cylinder and impression cylinder in the film transfer apparatus, the film feed speed and sheet conveyance speed must be equal as the sheet and film are superposed on the impression cylinder. However, as described earlier, rotation control by the unwinder device is insufficient to make the film feed speed and the sheet conveyance speed exactly equal. For this reason, making the film feed speed and the sheet conveyance speed exactly equal requires a film storage device for temporarily storing a film unreeled from the unwinding reel, and supplying the film to the nip portion at the same speed as the sheet conveyance speed.

The film storage device practically uses a method of forming a U-shaped portion in a film inside and storing the film, thereby reducing and absorbing the difference between the length of the film unreeled from the unwinding reel and that of the film which passes through the nip portion. The U-shaped portion is formed by a flat portion serving as one side surface, a flat portion serving as the other side surface opposed to one side surface, and a semicircular, arcuated portion serving as the bottom surface between the two side surfaces. The U-shaped portion is formed so that one side surface, the bottom surface, and the other side surface are continuous with each other without bending of the bottom surface.

As a scheme of forming such a U-shaped portion, a scheme which uses a dancer roller disclosed in patent literature 1, or a scheme which uses an aerodynamic device disclosed in U.S. Pat. No. 6,230,616B1 (patent literature 3) is available.

The film used in the film transfer apparatus is a highly stretchable soft material formed using, as a base material, a high-polymer film having a very small thickness that falls within the range of 12 to 20 micrometers. The smaller the width of the film, the lower the tension to be applied to the film must become. When the film is unreeled from the unwinding reel at a higher speed, a fluctuation in tension inevitably occurs due to the above-mentioned factor. As the width of the film reduces, a fluctuation in tension must be absorbed so as to keep it smaller. However, in the scheme which uses a dancer roller, the force of inertia of the dancer roller has a considerable influence on the error, so a limit is imposed in combating this problem. Under the circumstances, the scheme which uses an aerodynamic device is becoming the current mainstream.

From the viewpoint of improving the productivity as well, it is desired to provide a high-speed sheet-fed offset rotary film transfer apparatus which can be equipped with an unwinding reel having a larger diameter and smaller width. When the film transfer apparatus is equipped with a large-diameter unwinding reel, a film length sufficient for film transfer can be ensured, thus saving the temporary stop time taken to refill a new unwinding reel. Also, when the film transfer apparatus is capable of a high-speed operation, film transfer can be completed in a shorter period of time than in the related art techniques.

Unfortunately, a set of upstream and downstream film transfer units sandwich a unit which performs a different type of processing. This makes it difficult to ensure a space to arrange a large-diameter unwinding reel, and an operation space for the arrangement.

SUMMARY OF THE INVENTION

The present invention has been made in consideration of the above-mentioned problem, and has as its object to provide a film transfer apparatus which can be equipped with a large-diameter unwinding reel, and ensure an operation space to arrange the unwinding reel.

In order to achieve the above-mentioned object, according to the present invention, there is provided a film transfer apparatus comprising an unwinder device which rotatably supports an unwinding reel including a film wound therearound, and unwinds the film from the unwinding reel, a film storage unit which forms a U-shaped portion in the film supplied from the unwinder device and stores the film, a film transfer cylinder which is supported rotatably and presses the film delivered from the film storage unit against a sheet, and a rewinder device which rotatably supports a rewinding reel, and rewinds around the rewinding reel the film transferred via the film transfer cylinder, the film storage unit including an air blow device which blows air from above toward a bottom portion of the U-shaped portion of the film, and an infeed roller which pulls the film stored in the film storage unit out of the film storage unit to transfer the film onto the film transfer cylinder, wherein the film storage unit is disposed vertically above the film transfer cylinder, and the unwinder device and the rewinder device are disposed vertically above the film storage unit to be vertically aligned with each other.

DESCRIPTION OF THE PREFERRED EMBODIMENT

An embodiment of the present invention will be described in detail below with reference to the accompanying drawings. The case wherein which a film transfer apparatus according to the present invention is applied to a sheet-fed offset rotary printing press will be taken as an exemplary embodiment herein.

1. Entire Arrangement of Sheet-Fed Offset Rotary Printing Press 1

Figure 1:
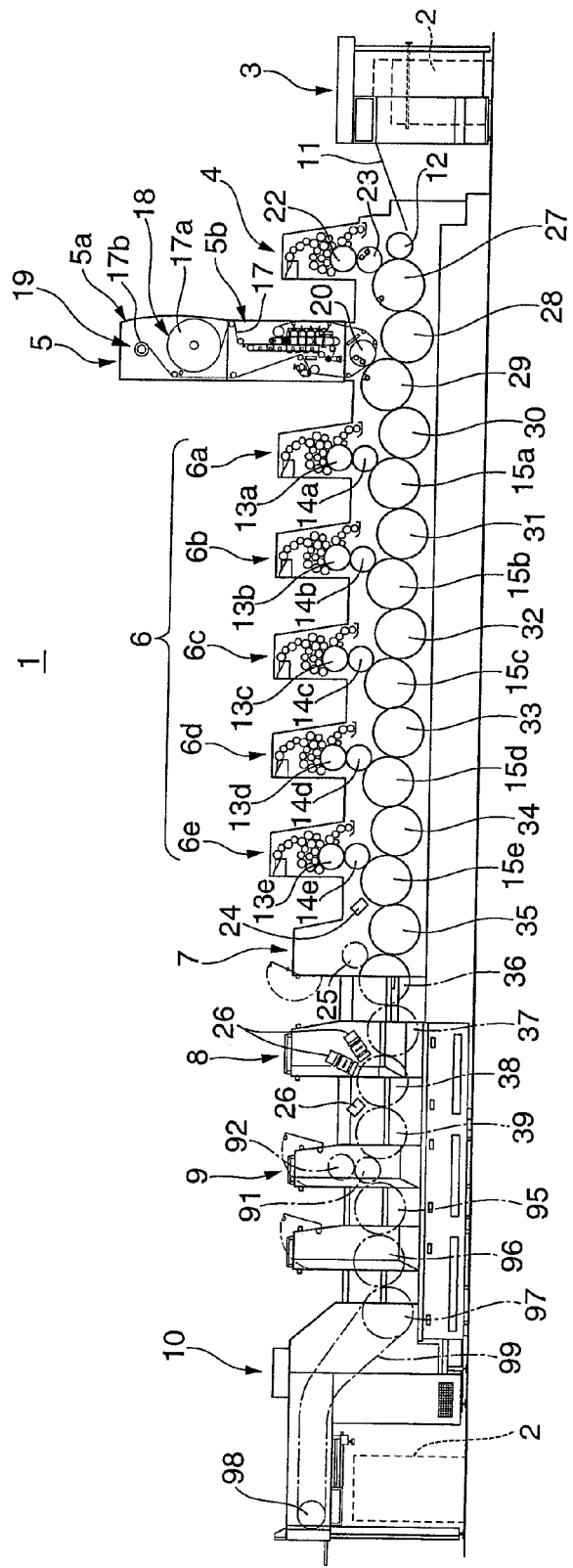
FIG. 1 is a side view showing the entire arrangement of a sheet-fed offset rotary printing press including a foil transfer unit according to an embodiment of the present invention.

A sheet-fed offset rotary printing press 1 shown in FIG. 1 includes a sheet feed device 3, adhesive transfer unit 4, foil transfer unit (sheet-fed offset rotary film transfer device) 5, printing device 6, varnish coating unit 7, drying unit 8, embossing unit 9, and sheet delivery device 10. The sheet feed device 3 serves as a sheet supply device which supplies a sheet 2 such as paper. The adhesive transfer unit 4 transfers an adhesive onto the sheet 2. The foil transfer unit 5 transfers foil onto the sheet 2. The printing device 6 includes a set of five printing units 6a to 6e which print on the sheet 2. The varnish coating unit 7 applies varnish onto the sheet 2. The embossing unit 9 embosses the sheet 2. The sheet delivery device 10 serves as a sheet discharge device which discharges the sheet 2.

The sheet feed device 3 is provided with a feeder board 11 which supplies sheets 2 onto a transfer cylinder 12 one by one.

The adhesive transfer unit 4 includes a plate cylinder 22, blanket cylinder 23, and impression cylinder 27. The plate cylinder 22 has a plate mounted on its circumferential surface. The blanket cylinder 23 is in contact with the plate cylinder 22. The impression cylinder 27 has a diameter double that of the plate cylinder 22, is opposed to the blanket cylinder 23, and holds and conveys the sheet 2. The transfer cylinder 12 is provided upstream of the impression cylinder 27 in the direction in which the sheet 2 is conveyed, and is in contact with the impression cylinder 27, and a transfer cylinder 28 is provided downstream of the impression cylinder 27 in the direction in which the sheet 2 is conveyed, and is in contact with the impression cylinder 27.

The foil transfer unit 5 is disposed downstream of the adhesive transfer unit 4 in the direction in which the sheet 2 is conveyed. The foil transfer unit 5 includes a film transfer cylinder 20, impression cylinder 29, reel stand device 5a (to be described later), and film storage device 5b (to be described later). The film transfer cylinder 20 is supported rotatably and has a blanket mounted on its circumferential surface. The impression cylinder 29 has a diameter double that of the film transfer cylinder 20, is opposed to the film transfer cylinder 20, and holds and conveys the sheet 2. The transfer cylinder 28 is provided upstream of the impression cylinder 29 in the direction in which the sheet 2 is conveyed, and is in contact with the impression cylinder 29, and a transfer cylinder 30 is provided downstream of the impression cylinder 29 in the direction in which the sheet 2 is conveyed, and is in contact with the impression cylinder 29. The foil transfer unit 5 performs cold foil stamping, in which a film 17 having foil deposited on it is brought into press contact with the surface of the sheet 2 having an adhesive printed on it, thereby transferring the foil onto the sheet 2. The foil transfer unit 5 is an embodiment of the film transfer apparatus according to the present invention.

The printing device 6 is disposed downstream of the foil transfer unit 5 in the direction in which the sheet 2 is conveyed. The set of five printing units 6a to 6e include plate cylinders 13a to 13e, blanket cylinders 14a to 14e, and impression cylinders 15a to 15e, respectively. The plate cylinders 13a to 13e have plates mounted on their circumferential surfaces. The blanket cylinders 14a to 14e are in contact with the plate cylinders 13a to 13e, respectively. The impression cylinders 15a to 15e have a diameter double that of the plate cylinders 13a to 13e, are opposed to the blanket cylinders 14a to 14e, respectively, and hold and convey the sheet 2. The impression cylinders 15a to 15e are connected to the transfer cylinders 30, 31, 32, 33, 34, and 35. The most downstream printing unit 6e includes a UV lamp 24 which is opposed to the impression cylinder 15e, and irradiates the sheet 2 held by the impression cylinder 15e with ultraviolet rays.

The varnish coating unit 7 is disposed downstream of the printing device 6 in the direction in which the sheet 2 is conveyed. The varnish coating unit 7 includes a varnish supply cylinder 25 and impression cylinder 36. The varnish supply cylinder 25 has a plate mounted on its circumferential surface. The impression cylinder 36 has a diameter double that of the varnish supply cylinder 25, is opposed to the varnish supply cylinder 25, and holds and conveys the sheet 2. The transfer cylinder 35 is provided upstream of the impression cylinder 36 in the direction in which the sheet 2 is conveyed, and is in contact with the impression cylinder 36, and a transfer cylinder 37 is provided downstream of the impression cylinder 36 in the direction in which the sheet 2 is conveyed, and is in contact with the impression cylinder 36.

The drying unit 8 is disposed downstream of the varnish coating unit 7 in the direction in which the sheet 2 is conveyed. The drying unit 8 includes a transfer cylinder 38 and three UV lamps 26. The UV lamps 26 are opposed to the transfer cylinder 38, and irradiate the sheet 2 held by the transfer cylinder 38 with ultraviolet rays. The transfer cylinder 37 is provided upstream of the transfer cylinder 38 in the direction in which the sheet 2 is conveyed, and is in contact with the transfer cylinder 38, and a transfer cylinder 39 is provided downstream of the transfer cylinder 38 in the direction in which the sheet 2 is conveyed, and is in contact with the transfer cylinder 38.

The embossing unit 9 is disposed downstream of the drying unit 8 in the direction in which the sheet 2 is conveyed. The embossing unit 9 includes an embossing cylinder 92 and counter-cylinder 91. The embossing cylinder 92 has an embossing plate mounted on its circumferential surface. The counter-cylinder 91 has a diameter equal to that of the embossing cylinder 92, is opposed to the embossing cylinder 92, and holds and conveys the sheet 2. The transfer cylinder 39 is provided upstream of the counter-cylinder 91 in the direction in which the sheet 2 is conveyed, and is in contact with the counter-cylinder 91, and a transfer cylinder 95 is provided downstream of the counter-cylinder 91 in the direction in which the sheet 2 is conveyed, and is in contact with the counter-cylinder 91.

The sheet delivery device 10 is disposed downstream of the embossing unit 9 in the direction in which the sheet 2 is conveyed. The sheet delivery device 10 includes a delivery cylinder 97, sprocket (not shown), sprocket 98, delivery chain 99, and delivery pile. The sprocket (not shown) is coaxial with the delivery cylinder 97. The sprocket 98 is provided at the terminal end of the sheet delivery device 10. The delivery chain 99 is looped around these two sprockets, and includes a gripper bar (not shown) which holds the sheet 2. The delivery pile is used to stack the sheet 2. A transfer cylinder 96 is provided upstream of the delivery cylinder 97 in the direction in which the sheet 2 is conveyed, and is in contact with the delivery cylinder 97, and the transfer cylinder 95 is provided upstream of the transfer cylinder 96 in the direction in which the sheet 2 is conveyed, and is in contact with the transfer cylinder 96.

2. Arrangement of Foil Transfer Unit 5

Figure 2:
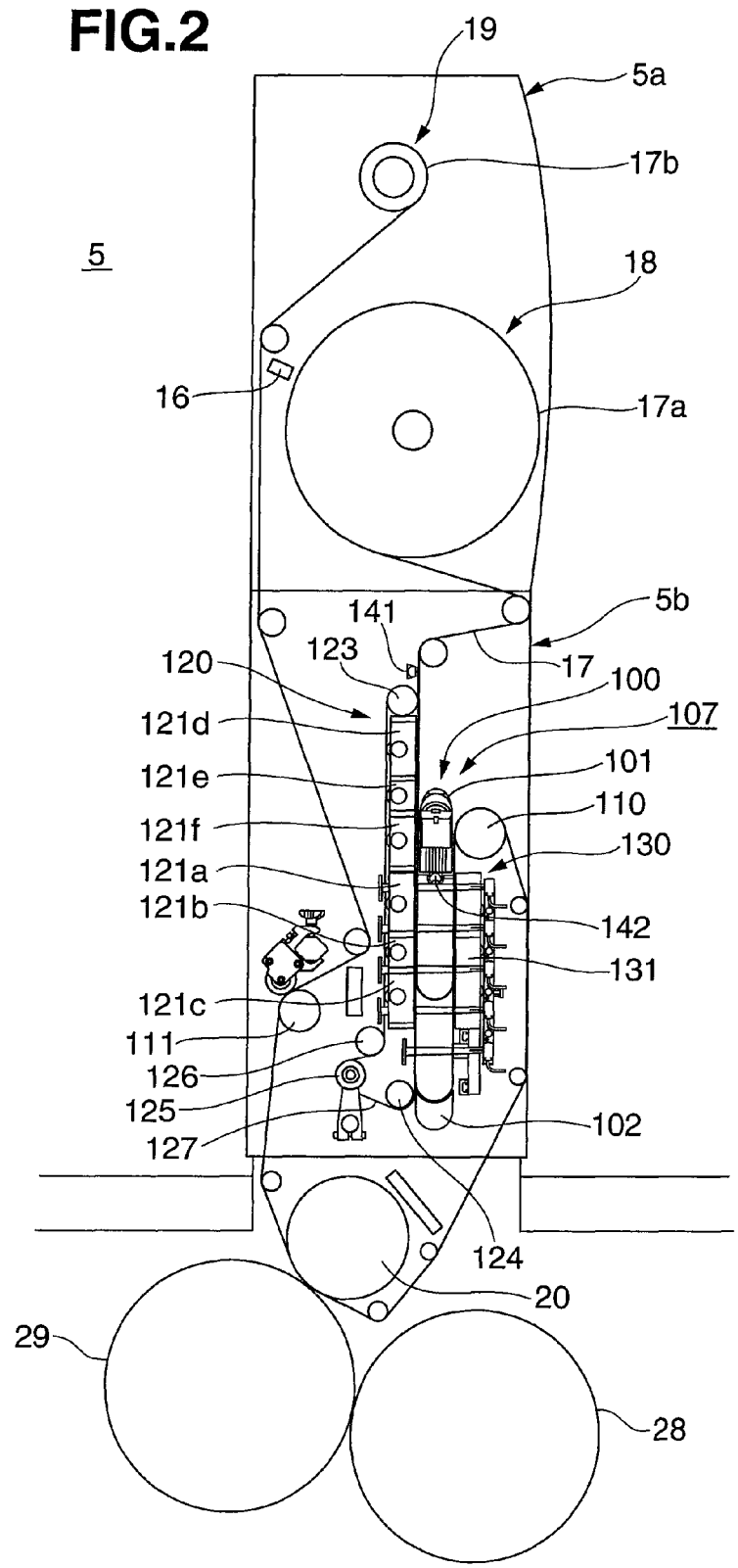
FIG. 2 is a side view showing the structure of the foil transfer unit.

The foil transfer unit 5 includes the film transfer cylinder 20, impression cylinder 29, reel stand device 5a, and film storage device 5b, as described above. The reel stand device 5a is arranged vertically above the film transfer cylinder 20, as shown in FIG. 2. The film storage device 5b is arranged between the reel stand device 5a and the film transfer cylinder 20, that is, at a position that is vertically above the film transfer cylinder 20 and vertically below the reel stand device 5a. In other words, the film storage device 5b is provided directly above the film transfer cylinder 20, and the reel stand device 5a is provided directly above the film storage device 5b. Note that in this specification, "the vertical direction" means "a direction perpendicular to the horizontal surface."

2.1. Arrangement of Reel Stand Device 5a

The reel stand device 5a includes an unwinder device 18, ultrasound sensor 16, and rewinder device 19, as shown in FIG. 2.

The unwinder device 18 rotatably supports an unwinding reel 17a formed by reeling the film 17, and unwinds the film 17 from the unwinding reel 17a. The unwinder device 18 includes an unwinding reel driving motor 208 (see FIG. 11) which rotates the unwinding reel 17a. Foil to be transferred onto the sheet 2 is deposited on the film 17.

The ultrasound sensor 16 is opposed to the unwinding reel 17a of the unwinder device 18, and measures the distance to the outermost circumferential surface of the film 17 wound around the unwinding reel 17a.

The rewinder device 19 rotatably supports a rewinding reel 17b, and rewinds around the rewinding reel 17b the film 17 which is unwound from the unwinding reel 17a of the unwinder device 18 and transferred via the film transfer cylinder 20. This means that the rewinder device 19 rewinds the film 17 after the foil deposited on it is transferred onto the sheet 2.

2.2. Arrangement of Film Storage Device 5b

The film storage device 5b is disposed at a position that is downstream of the unwinder device 18 and upstream of the film transfer cylinder 20 in the direction in which the film 17 is transported, as shown in FIG. 2. The film storage device 5b includes a film storage unit 107 and a plurality of guide rollers.

The film storage unit 107 serves as a system which forms a U-shaped portion in the film 17 supplied from the unwinder device 18 of the reel stand device 5a and stores the film 17. The film storage unit 107 functions as a buffer which forms a portion of the film 17, which has been fed and is to be delivered, into a U-shape, and temporarily retains the film 17 inside. Note that the "U-shape" means the shape of the film 17 stored in the film storage unit 107 when viewed from the front side of FIG. 2. Since the film 17 has a band shape, the U-shaped portion of the film 17 in the film storage unit 107 is formed by a flat portion serving as one side surface (feed-side side surface), a flat portion serving as the other side surface (delivery-side side surface) opposed to one side surface, and an arcuated portion (bottom portion) serving as the bottom surface between the two side surfaces.

The film storage unit 107 includes an aerodynamic storage device 100, suction film feed device 120, suction film delivery device 130, and infeed roller 110.

The suction film feed device 120 is disposed on the side on which the film 17 is supplied from the unwinder device 18 to the film storage unit 107, and holds by suction and transports one side surface of the U-shaped portion of the film 17 in the film storage unit 107.

The suction film delivery device 130 is disposed on the side on which the film 17 is delivered from the film storage unit 107 by the infeed roller 110, and holds by suction the other side surface of the U-shaped portion of the film 17 in the film storage unit 107.

The suction film feed device 120 is opposed to the suction film delivery device 130 so that one side surface of the U-shaped portion of the film 17 is opposed to and parallel to its other side surface.

The aerodynamic storage device 100 is disposed between the suction film feed device 120 and the suction film delivery device 130, and forms and maintains an arcuated portion in the film 17 stored in the film storage unit 107.

The infeed roller 110 is disposed vertically above the suction film delivery device 130, and rotated to pull out the film 17 stored in the film storage unit 107 and feed it onto the film transfer cylinder 20.

The suction film feed device 120 is arranged on the upstream side in the direction in which the film 17 is transported, the suction film delivery device 130 is arranged downstream of the suction film feed device 120 in the direction in which the film 17 is transported, and the infeed roller 110 is arranged downstream of the suction film delivery device 130 in the direction in which the film 17 is transported.

2.2.1. Arrangement of Aerodynamic Storage Device 100

The aerodynamic storage device 100 includes an air blow device 101 and retraction devices 102, as shown in FIGS. 2 to 8.

The air blow device 101 is arranged in the upper portion of the aerodynamic storage device 100, and blows air vertically downwards from above toward the bottom portion of the U-shaped portion of the film 17 in the film storage unit 107.

Figure 3:
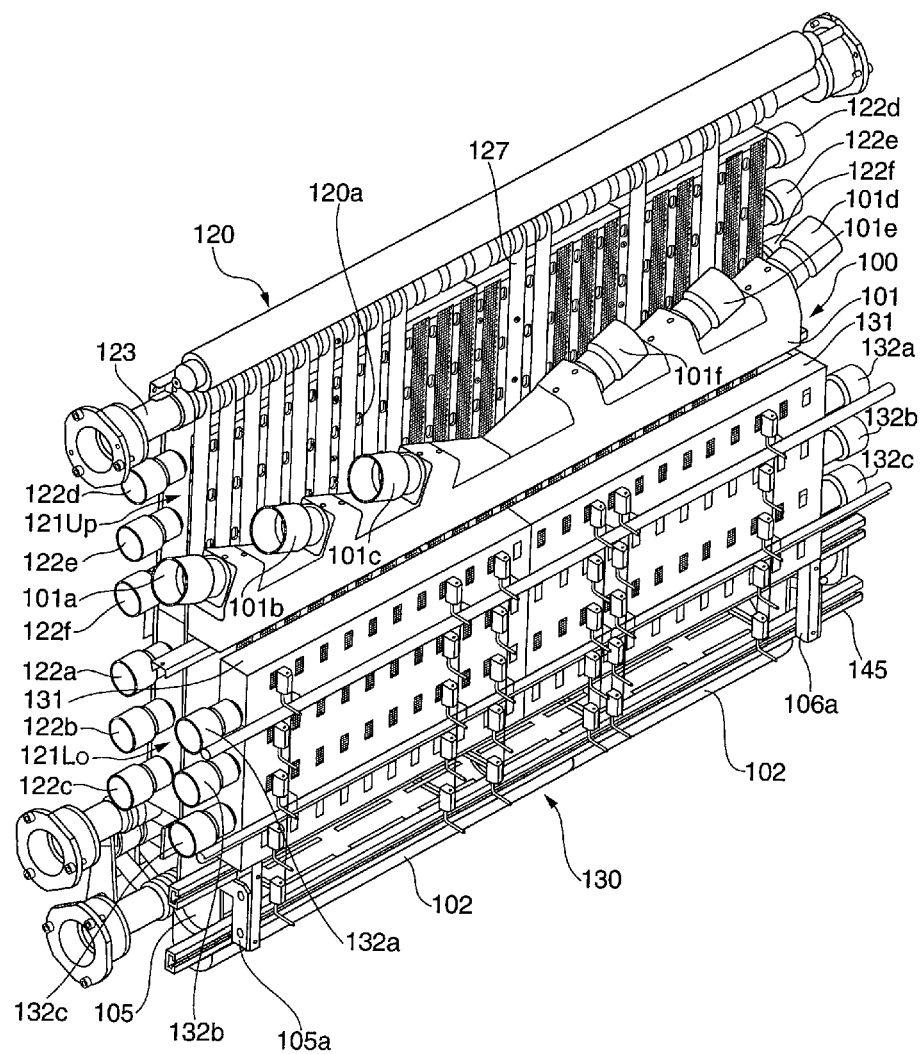
FIG. 3 is a perspective view showing the arrangement of an aerodynamic storage device.
Figure 4:
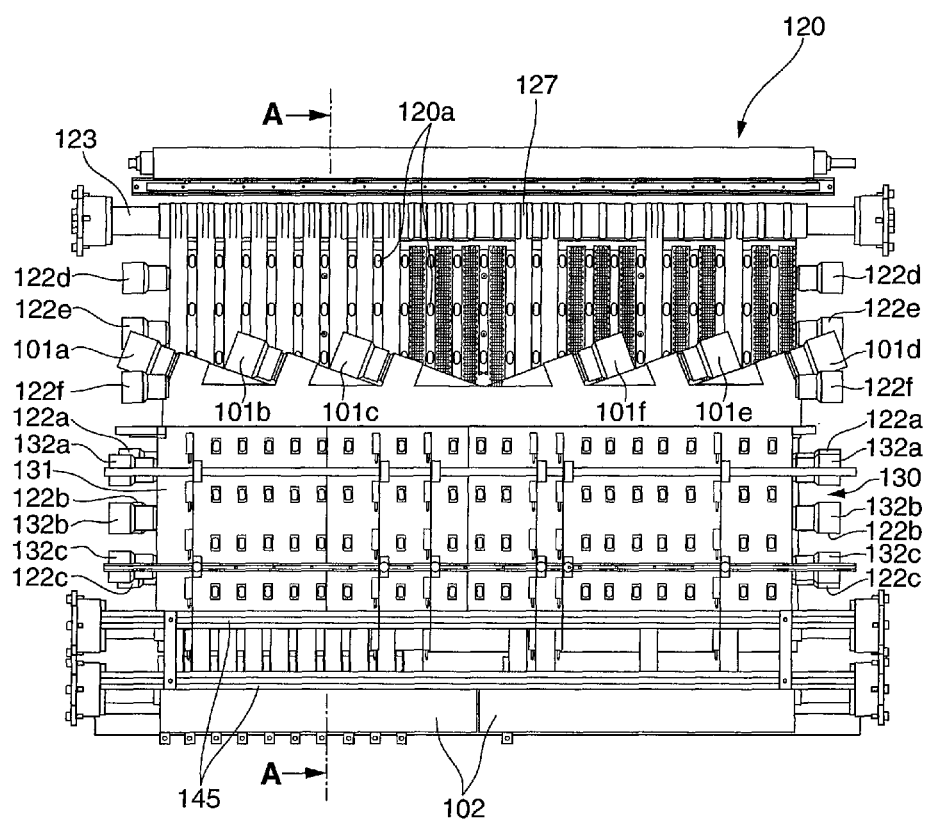
FIG. 4 is a front view showing the arrangement of the aerodynamic storage device.

The air blow device 101 is provided with a total of six air channels, that is, duct hose couplings 101*a* to 101*f* arranged in line in the machine widthwise direction (that is, the widthwise direction of the film 17), as shown in FIGS. 3 and 4. The entrances of the duct hose couplings 101*a* to 101*c* on the left sides of the paper surfaces of FIGS. 3 and 4 face the left exterior, and the duct hose couplings 101*d* to 101*f* on the right sides of the paper surfaces of FIGS. 3 and 4 face the right exterior. The duct hose couplings 101*a* to 101*f* are connected to blowers (not shown).

Figure 5:
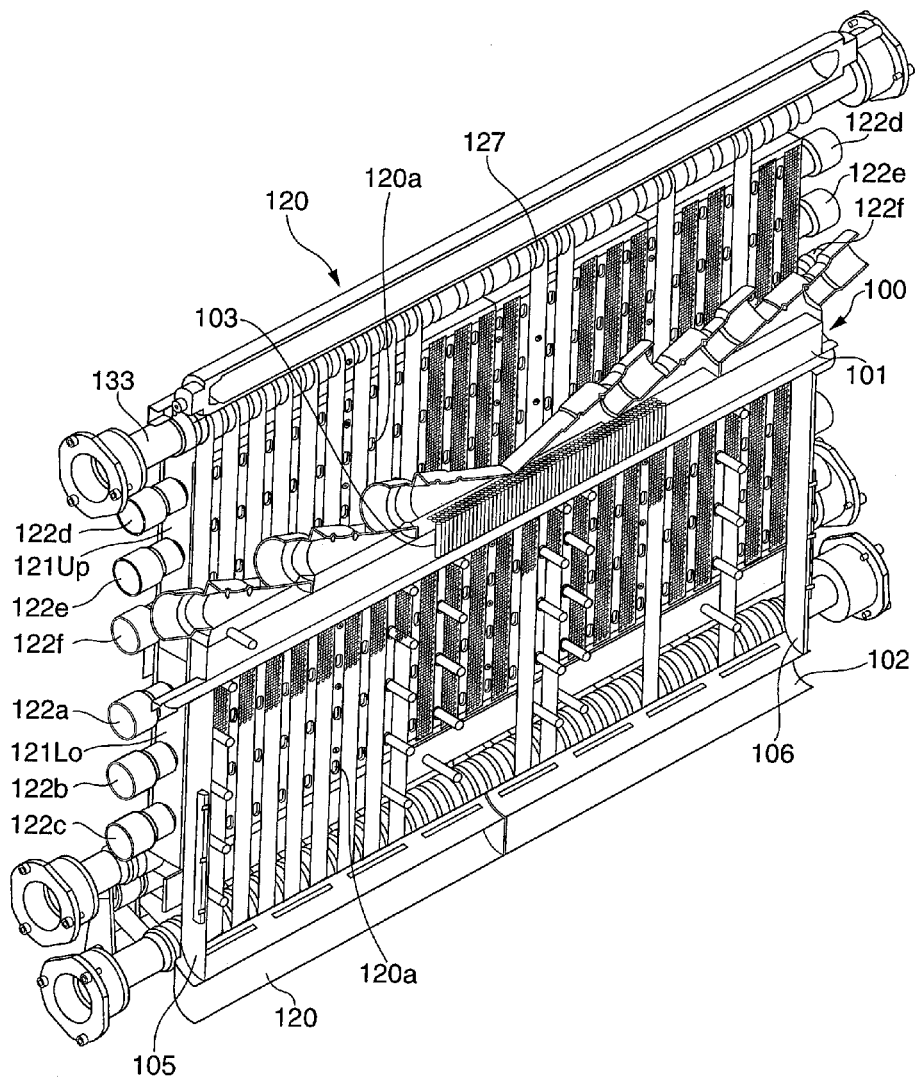
FIG. 5 is a sectional view showing the cross-sectional arrangement of the aerodynamic storage device.
Figure 6:
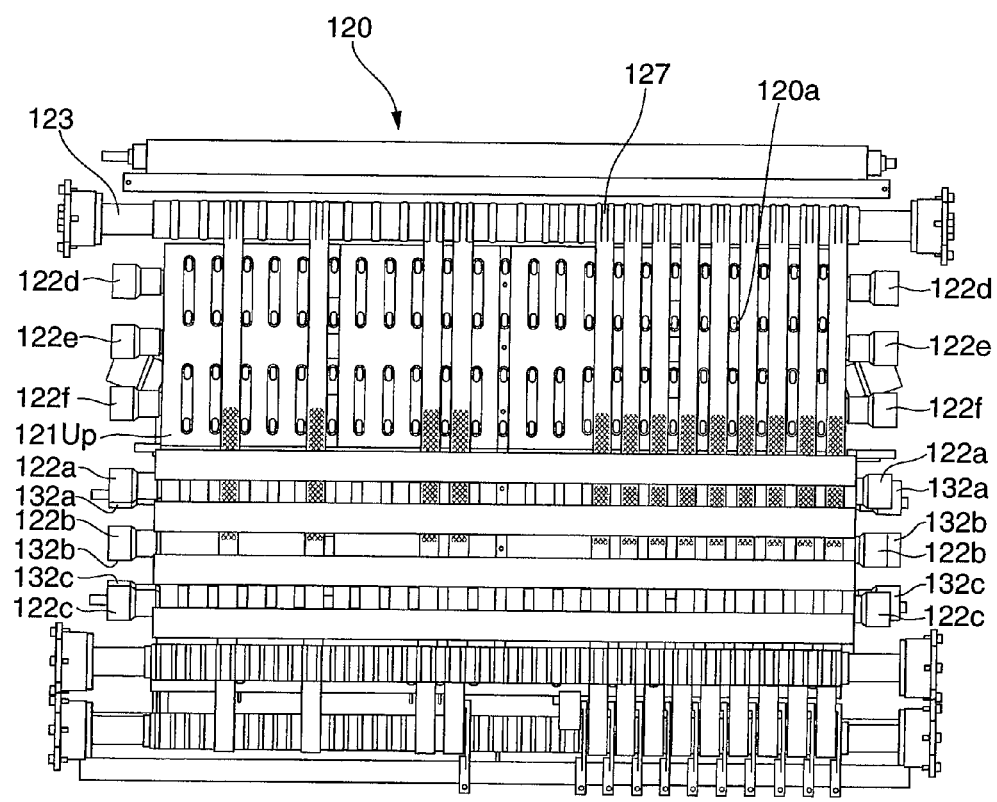
FIG. 6 is a back view showing the arrangement of the aerodynamic storage device.

A honeycomb flow conditioner 103 is provided directly below the exits of the duct hose couplings 101*a* to 101*f* to extend vertically downwards, as shown in FIG. 5. The flow conditioner 103 forms air blown out of the duct hose couplings 101*a* to 101*f* into a vertically downward laminar flow.

The retraction device 102 is opposed to the air blow device 101 in the lower portion of the aerodynamic storage device 100, and draws by suction the bottom portion of the U-shaped portion of the film 17 in the film storage unit 107 vertically downwards.

The retraction device 102 is a suction box, as shown in FIGS. 3 to 5. The surface of the retraction device 102, opposed to the film 17, is formed in a recessed arcuated shape and has a plurality of suction holes formed in it. The retraction device 102 is connected to a suction source (not shown). In this embodiment, two retraction devices 102 are juxtaposed in the widthwise direction of the film 17.

In the aerodynamic storage device 100, two partition plates 105 and 106 are arranged at the positions of the two ends of the film 17 to be opposed to each other, as shown in FIGS. 3 and 5. The partition plates 105 and 106 are slidably supported through leg portions 105*a* and 106*a*, respectively, by a guide rail 145 extending in the widthwise direction of the film 17. Therefore, the interval between the partition plates 105 and 106 can be changed in accordance with the width of the film 17.

Figure 7:
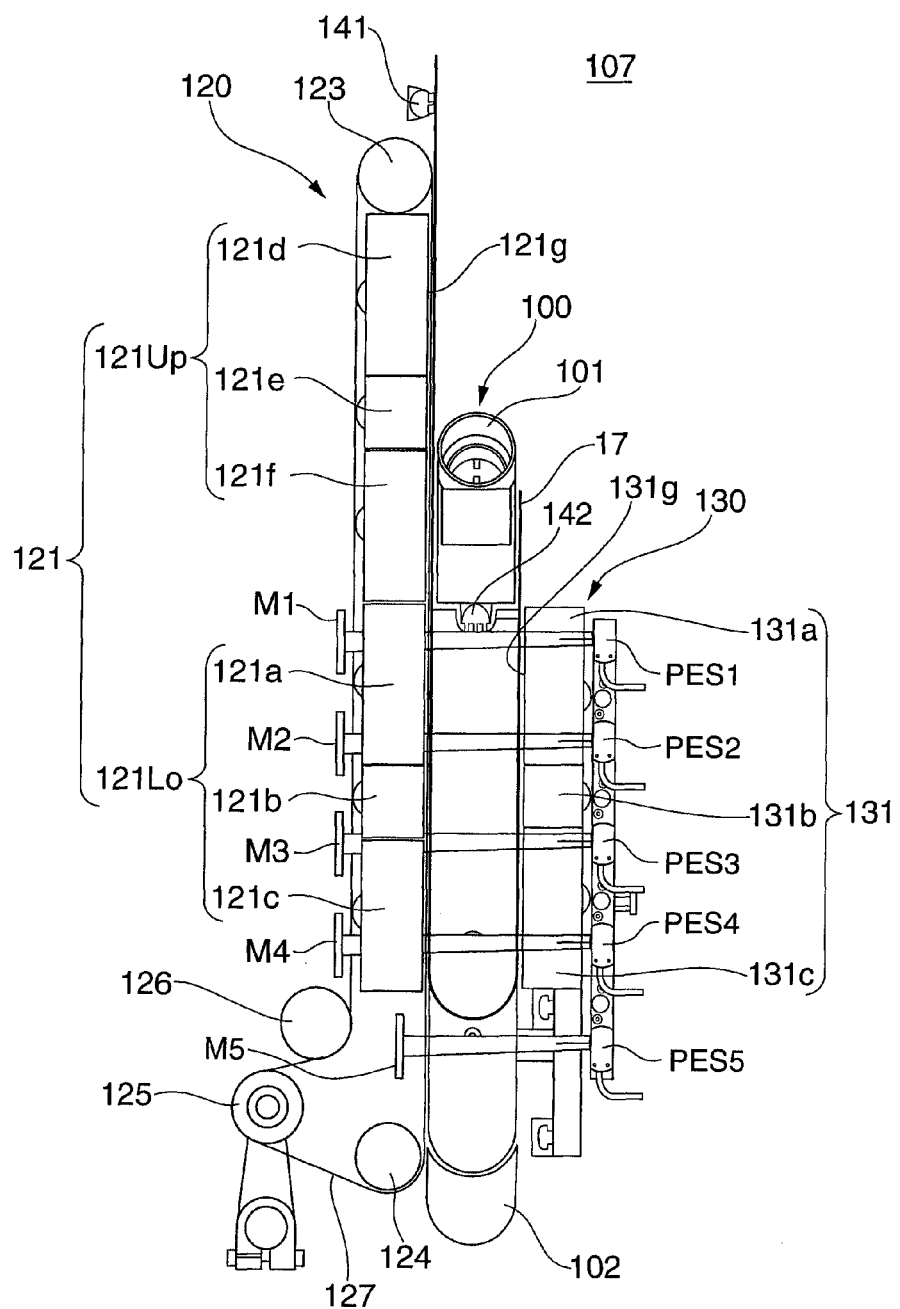
FIG. 7 is a side view showing the arrangements of the aerodynamic storage device, a suction film feed device, and a suction film delivery device.
Figure 8:
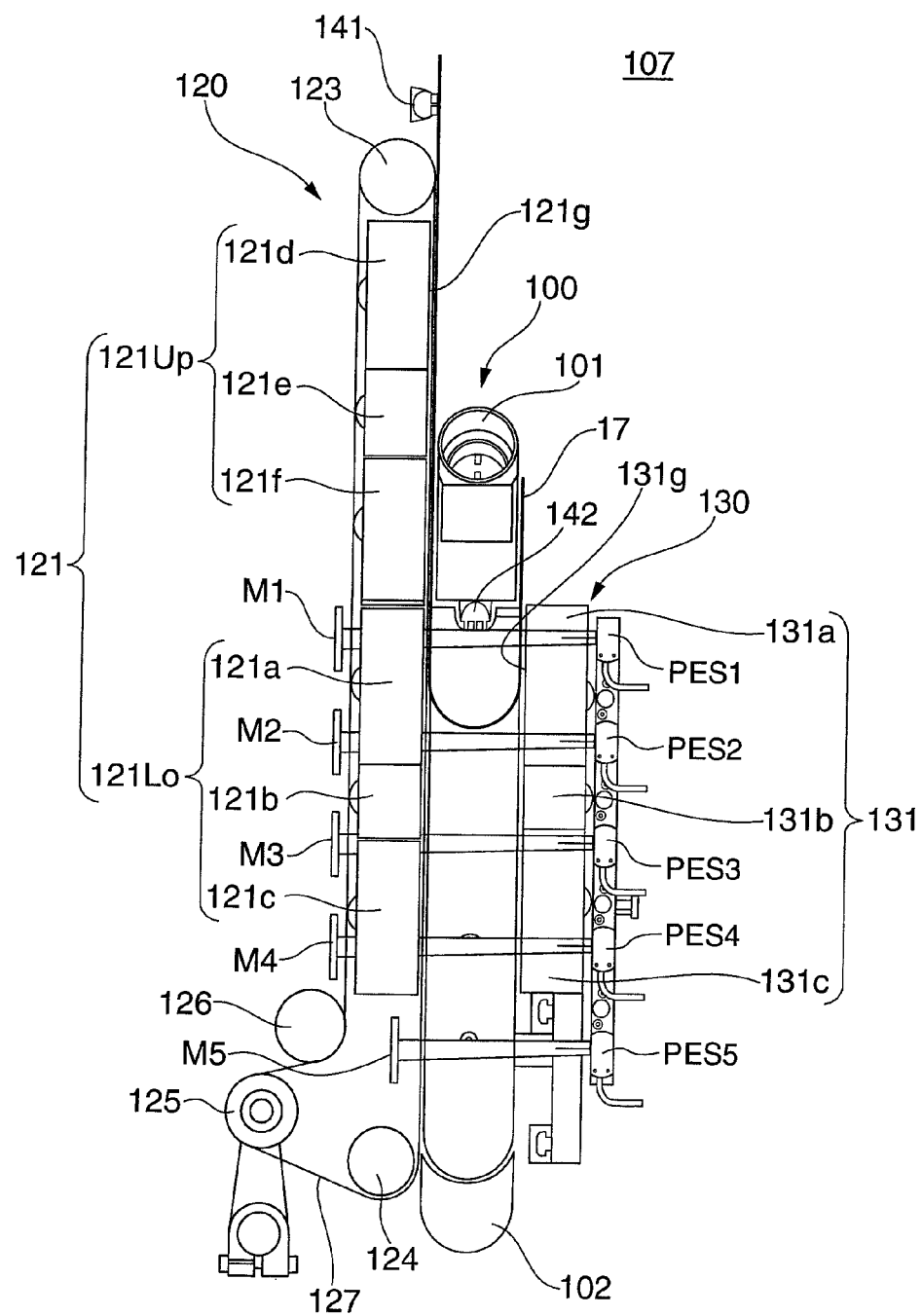
FIG. 8 is a side view showing the arrangements of the aerodynamic storage device, suction film feed device, and suction film delivery device.

Note that a static electricity removing device 142 which removes static electricity generated on the foil deposition surface, that is, the front surface of the film 17 is arranged in the air blow device 101, as shown in FIGS. 7 and 8. Also, a static electricity removing device 141 which removes static electricity generated on the back surface of the film 17 is arranged upstream of the suction film feed device 120 in the direction in which the film 17 is transported.

2.2.2. Arrangement of Suction Film Feed Device 120

The suction film feed device 120 includes a feed-side suction unit 121 which holds by suction one side surface of the U-shaped portion of the film 17 in the film storage unit 107, that is, the side surface of this U-shaped portion on the side on which the film 17 is supplied from the unwinder device 18, as shown in FIGS. 7 and 8. The feed-side suction unit 121 has a feed-side guide surface 121*g* which is opposed to one side surface of the U-shaped portion of the film 17, and guides the film 17.

The feed-side suction unit 121 includes a feed-side suction unit 121Lo and feed-side suction unit 121Up. The feed-side suction unit 121Lo serves as a downstream suction unit disposed downstream in the direction in which the film 17 is transported. The feed-side suction unit 121Up serves as an upstream suction unit disposed upstream of the feed-side suction unit 121Lo in the direction in which the film 17 is transported. That is, the feed-side suction unit 121Lo is arranged on the lower side, and the feed-side suction unit 121Up is arranged on the upper side.

Figure 9:
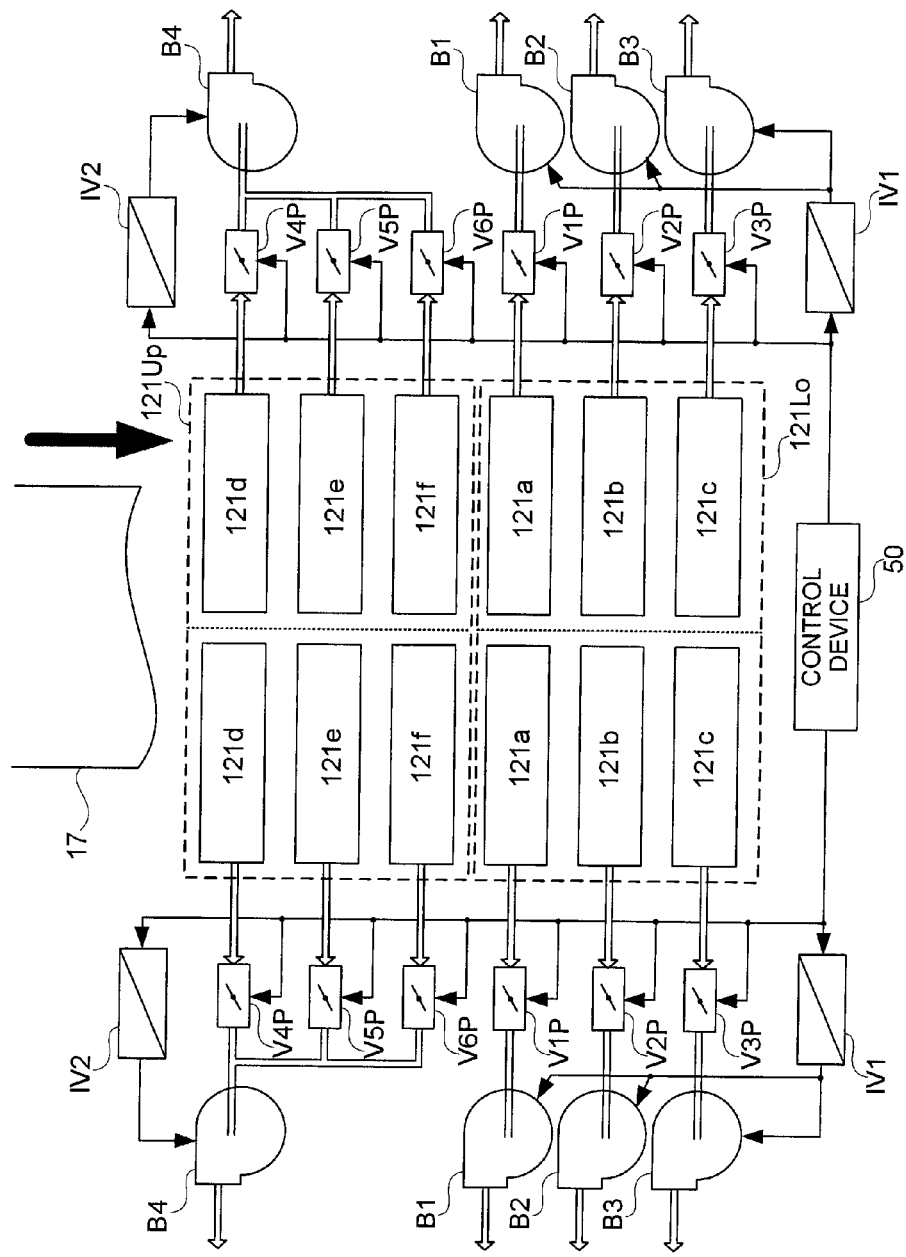
FIG. 9 is a diagram showing apparatus arrangement (1) for suction force control and unwinding amount control.

The lower feed-side suction unit 121Lo includes feed-side suction chambers 121*a* to 121*c* divided into a plurality of equal parts (three equal parts in this embodiment) in the direction in which the film 17 is transported, as shown in FIGS. 7 to 9. Each of the feed-side suction chambers 121*a* to 121*c* is further divided into two equal parts in the widthwise direction of the film 17. The feed-side suction chambers 121*a* to 121*c* can individually adjust their own suction forces.

Similarly, the upper feed-side suction unit 121Up includes feed-side suction chambers 121*d* to 121*f* divided into a plurality of equal parts (three equal parts in this embodiment) in the direction in which the film 17 is transported. Each of the feed-side suction chambers 121*d* to 121*f* is further divided into two equal parts in the widthwise direction of the film 17.

The feed-side suction chambers 121*d* to 121*f* and feed-side suction chambers 121*a* to 121*c* are consecutively juxtaposed in the direction in which the film 17 is transported, thereby forming a flat surface serving as the feed-side guide surface 121*g*, as shown in FIGS. 7 and 8.

Duct hose couplings 122*a* to 122*c* corresponding to the feed-side suction chambers 121*a* to 121*c* are provided at the two ends of the lower feed-side suction unit 121Lo in the widthwise direction, as shown in FIGS. 3 to 6. The duct hose couplings 122*a* to 122*c* are connected to feed-side variable airflow valves V1P to V3P, respectively, shown in FIG. 9, and the feed-side variable airflow valves V1P to V3P are connected to suction blowers B1 to B3, respectively, shown in FIG. 9. Accordingly, the feed-side suction unit 121Lo is connected to the suction blowers B1 to B3 via the duct hose couplings 122*a* to 122*c* and feed-side variable airflow valves V1P to V3P, respectively.

Duct hose couplings 122*d* to 122*f* corresponding to the feed-side suction chambers 121*d* to 121*f* are provided at the two ends of the upper feed-side suction unit 121Up in the widthwise direction as well, as shown in FIGS. 3 to 6. The duct hose couplings 122*d* to 122*f* are connected to feed-side variable airflow valves V4P to V6P, respectively, shown in FIG. 9, and all of the feed-side variable airflow valves V4P to V6P are connected to a single suction blower B4 shown in FIG. 9. Accordingly, the feed-side suction unit 121Up is connected to the suction blower B4 via the duct hose couplings 122*d* to 122*f* and feed-side variable airflow valves V4P to V6P, respectively.

A large number of small holes 120*a* for suction are formed in the feed-side guide surface 121*g* of the lower feed-side suction unit 121Lo and upper feed-side suction unit 121Up.

The suction film feed device 120 also includes a belt driving roller 124, a tension roller 125, driven rollers 126 and 123, and a conveyor belt 127, as shown in FIGS. 7 and 8. The belt driving roller 124, the tension roller 125, and the driven roller 126 are arranged below the lower feed-side suction unit 121Lo, while the driven roller 123 is arranged above the upper feed-side suction unit 121Up. The conveyor belt 127 is looped around the rollers 123 to 126 to surround the feed-side suction unit 121Up and feed-side suction unit 121Lo. The conveyor belt 127 has breathability and covers the large number of small holes 120*a* formed in the feed-side guide surface 121*g*.

2.2.3. Arrangement of Suction Film Delivery Device 130

The suction film delivery device 130 includes a delivery-side suction unit 131 which holds by suction the other side surface of the U-shaped portion of the film 17 in the film storage unit 107, that is, the side surface of this U-shaped portion on the side on which the film 17 is delivered by the infeed roller 110, as shown in FIGS. 7 and 8. The delivery-side suction unit 131 has a delivery-side guide surface 131g which is opposed to the other side surface of the U-shaped portion of the film 17, and guides the film 17.

The delivery-side suction unit 131 is opposed to only the lower feed-side suction unit 121Lo. This means that the upper feed-side suction unit 121Up is not opposed to the delivery-side suction unit 131. Therefore, the upper feed-side suction unit 121Up projects more to the upstream side, in the direction in which the film 17 is transported, than the delivery-side suction unit 131. In other words, the suction film feed device 120 projects more to the upstream side, in the direction in which the film 17 is transported, than the suction film delivery device 130, and is opposed to the suction film delivery device 130 to stand out upwards.

The delivery-side guide surface 131g of the delivery-side suction unit 131 is nearly parallel to the feed-side guide surface 121g of the feed-side suction unit 121.

Figure 10:
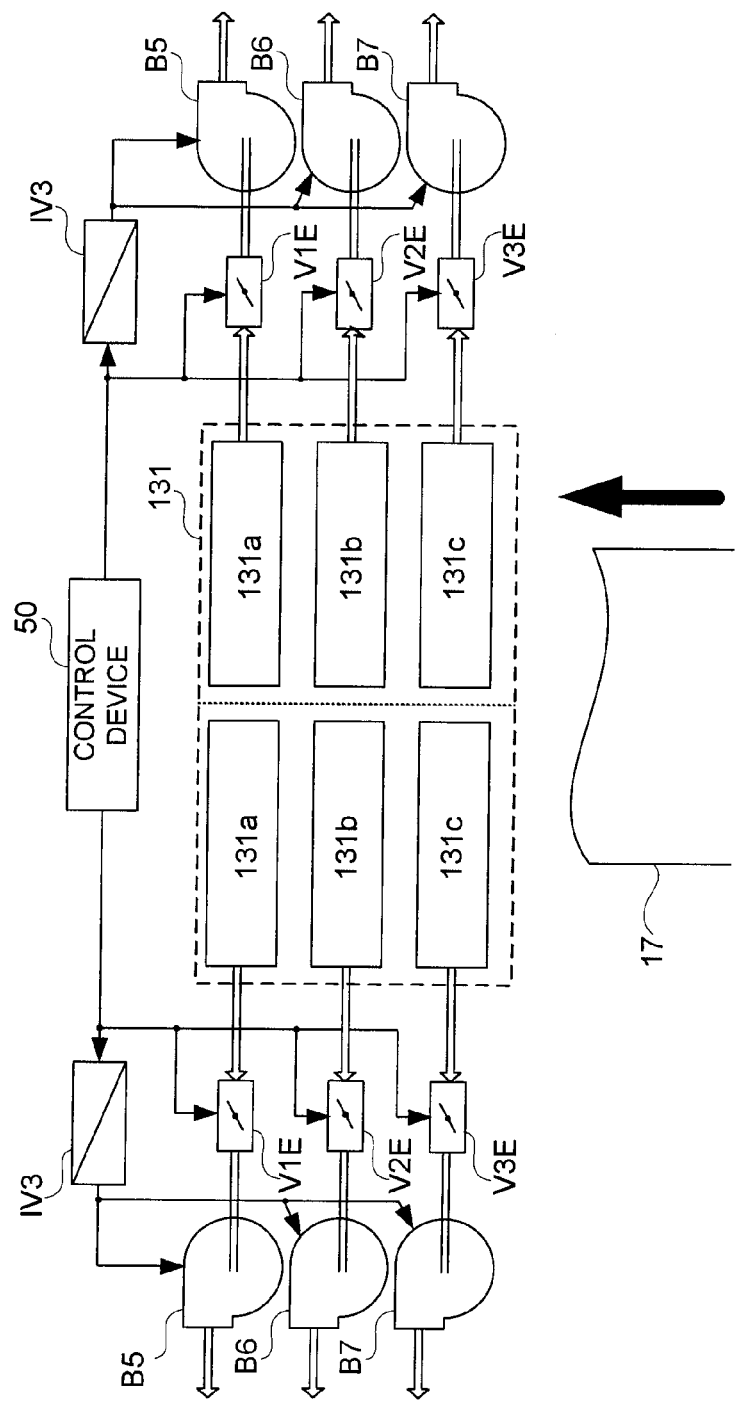
FIG. 10 is a partial diagram showing apparatus arrangement (2) for suction force control and unwinding amount control.

Like the lower feed-side suction unit 121Lo, the delivery-side suction unit 131 includes delivery-side suction chambers 131a to 131c divided into a plurality of equal parts (three equal parts in this embodiment) in the direction in which the film 17 is transported, as shown in FIGS. 7, 8, and 10. Each of the delivery-side suction chambers 131a to 131c is further divided into two equal parts in the widthwise direction of the film 17. The delivery-side suction chambers 131a to 131c are consecutively juxtaposed in the direction in which the film 17 is transported, thereby forming a flat surface serving as the delivery-side guide surface 131g. The delivery-side suction chambers 131a to 131c can individually adjust their own suction forces.

The delivery-side suction chambers 131a to 131c are provided with duct hose couplings 132a to 132c, respectively, as shown in FIGS. 3 to 6. The duct hose couplings 132a to 132c are connected to delivery-side variable airflow valves V1E to V3E, respectively, shown in FIG. 10, and the delivery-side variable airflow valves V1E to V3E are connected to suction blowers B5 to B7, respectively, shown in FIG. 10. A large number of small holes (not shown) are formed in the delivery-side guide surface 131g of the delivery-side suction unit 131.

Note that unlike the suction film feed device 120, the suction film delivery device 130 includes no conveyor belt equivalent to the conveyor belt 127, and therefore simply draws the film 17 by suction.

Figure 12:
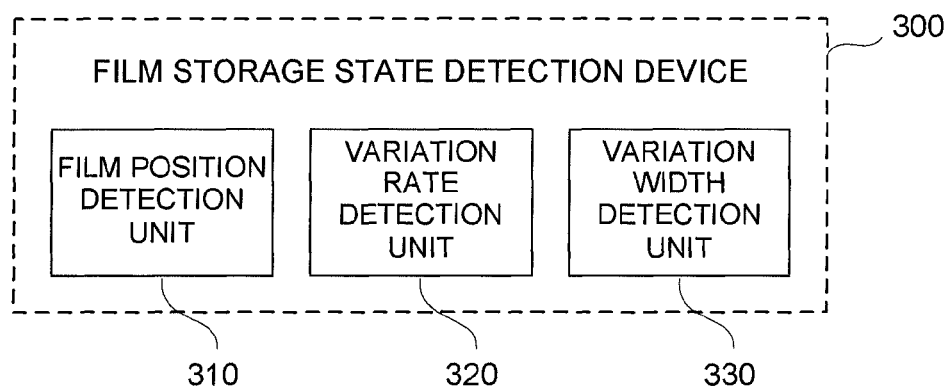
FIG. 12 is a block diagram showing the configuration of a film storage state detection device.

2.2.4. Suction Force Control Mechanism and Unwinding Amount Control Mechanism The foil transfer unit 5 includes a film storage state detection device 300 which detects the storage state of the film 17 in the film storage unit 107, as shown in FIG. 12. The film storage state detection device 300 includes a film position detection unit 310, variation rate detection unit 320, and variation width detection unit 330.

The film position detection unit 310 detects the presence/absence of a film 17 in the film storage unit 107, detects the position of the bottom portion of the U-shaped portion of the film 17, and outputs the detection result. The film position detection unit 310 includes a plurality of light projecting/receiving photoelectric sensors PES1 to PES5 and a plurality of reflectors (reflecting plates) M1 to M5 shown in FIGS. 7 and 8.

The photoelectric sensors PES1 to PES4 are juxtaposed in the delivery-side suction chambers 131a to 131c of the film storage unit 107 with gaps between them in the direction in which the film 17 is transported. The photoelectric sensor PES5 is disposed below the lowermost photoelectric sensor PES4, that is, below the delivery-side suction chambers 131a to 131c.

The reflectors M1 to M4 are disposed in the feed-side suction chambers 121a to 121c to be opposed to the photoelectric sensors PES1 to PES4, respectively. The reflector M5 is opposed to the photoelectric sensor PES5.

The positions of the photoelectric sensors PES1 to PES4 and reflectors M1 to M4 will be described in detail with reference to FIGS. 7 and 8. The photoelectric sensor PES1 and reflector M1 are positioned in the upper portions of the delivery-side suction chamber 131a and feed-side suction chamber 121a, respectively. The photoelectric sensor PES2 and reflector M2 are positioned in the lower portions of the delivery-side suction chamber 131a and feed-side suction chamber 121a, respectively. The photoelectric sensor PES3 is positioned at the boundary portion between the delivery-side suction chambers 131b and 131c, and the reflector M3 is positioned at the boundary portion between the feed-side suction chambers 121b and 121c. The photoelectric sensor PES4 and reflector M4 are positioned in the lower portions of the delivery-side suction chamber 131c and feed-side suction chamber 121c, respectively.

The variation rate detection unit 320 calculates the amount of film storage change per unit time based on the amount of unwinding of the film 17 from the unwinding reel 17a within a predetermined time, and the amount of delivery of the film 17 from the film storage unit 107 within the predetermined time, and outputs the calculation result as a film variation rate. The variation rate detection unit 320 includes a set of detectors (the ultrasound sensor 16, an unwinding reel driving detector 205, an infeed roller driving detector 206, and a rotary encoder 209) used to calculate the variation rate, and a variation rate calculation unit 321 implemented by a computer 40 (to be described later).

The variation width detection unit 330 calculates the maximum amount of movement of the arcuated portion of the U-shaped portion of the film 17 in the film storage unit 107 based on the detection results obtained by the photoelectric sensors PES1 to PES5, and outputs the calculation result as a variation width. The variation width detection unit 330 includes a detector (a timer 207) used to calculate the variation width, and a variation width calculation unit 331 implemented by the computer 40.

Figure 13:
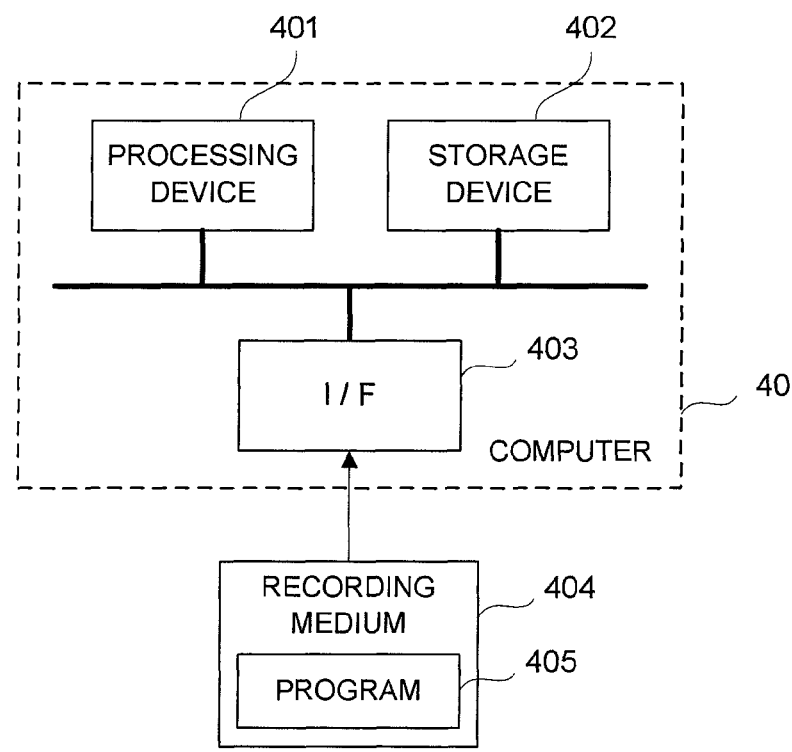
FIG. 13 is a block diagram showing the configuration of a computer.
Figure 14:
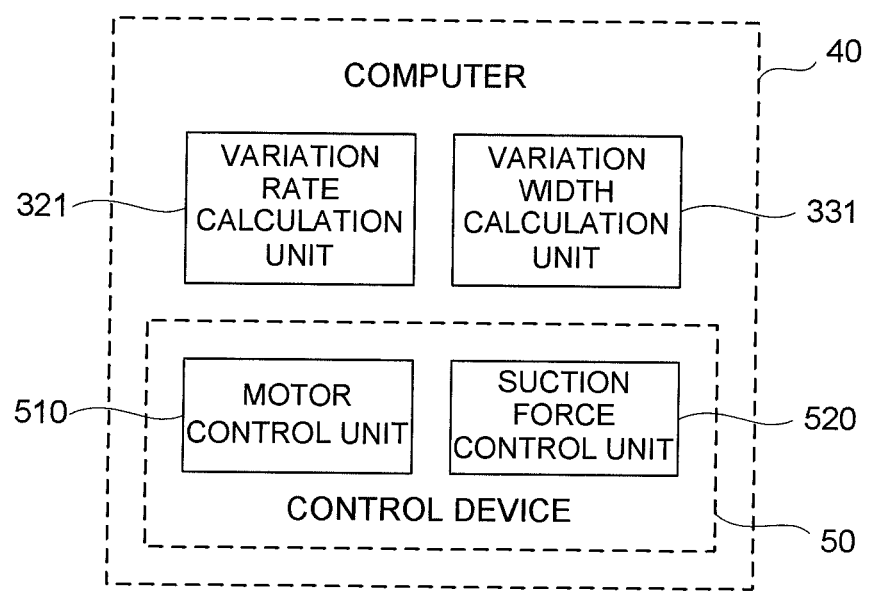
FIG. 14 is a block diagram showing functional units implemented by the computer.

The foil transfer unit 5 includes the computer 40 shown in FIG. 13. The computer 40 includes a processing device 401 such as a CPU, a storage device 402 such as a memory, and an I/O interface 403. The processing device 401 reads out a program 405 recorded on a computer-readable recording medium 404 such as an optical disk, and executes the program 405, thereby implementing the variation rate calculation unit 321, the variation width calculation unit 331, a motor control unit 510, and a suction force control unit 520 shown in FIG. 14. Among these units, the motor control unit 510 and suction force control unit 520 constitute a control device 50.

The motor control unit 510 controls the unwinding reel driving motor 208 which rotates the unwinding reel 17a, based on the detection result output from the above-mentioned film position detection unit.

The suction force control unit 520 controls the suction force of the feed-side suction unit 121 of the suction film feed device 120, and that of the delivery-side suction unit 131 of the suction film delivery device 130, in accordance with the initial conditions or the storage state of the film 17 during the operation of the sheet-fed offset rotary printing press 1.

The control device 50 is connected to the suction blowers B1 to B3 via an inverter IV1, and connected to the suction blower B4 via an inverter IV2, as shown in FIG. 9. Also, the control device 50 is connected to the suction blowers B5 to B7 via an inverter IV3, as shown in FIG. 10. The suction force control unit 520 of the control device 50 can individually adjust the outputs from the suction blowers B1 to B7.

Figure 11:
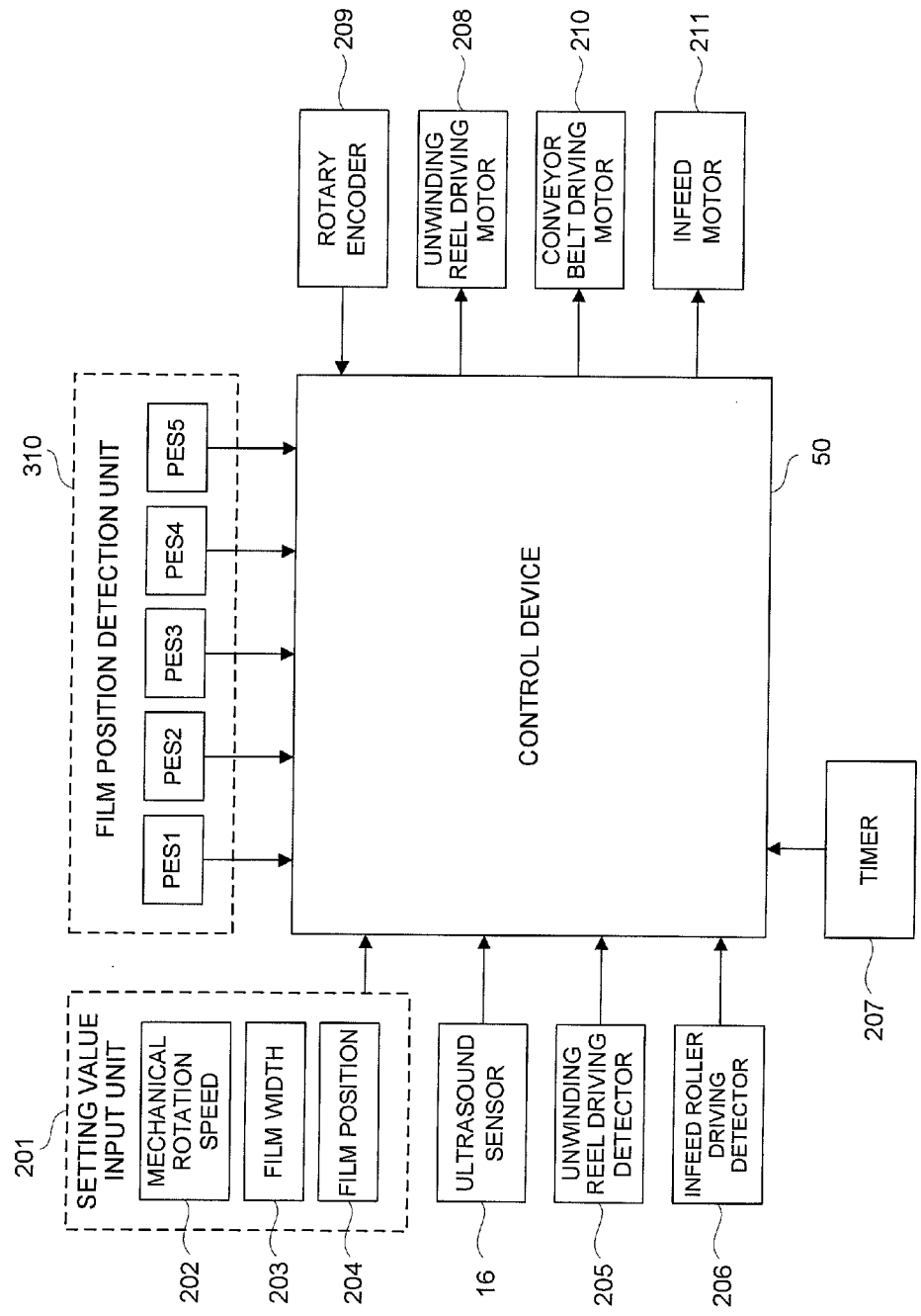
FIG. 11 is a block diagram showing a circuit configuration for suction force control and unwinding amount control.

The control device 50 is connected to a setting value input unit 201, as shown in FIG. 11. The setting value input unit 201 receives a setting value for an operating speed (to be referred to as the mechanical rotation speed hereinafter) 202 of the sheet-fed offset rotary printing press 1, that for a film width 203 of the film 17 attached to the unwinder device 18, and that for a position (to be referred to as the film position hereinafter) 204 in the widthwise direction of the film 17 relative to the sheet 2 onto which the foil is transferred. Note that the operating speed (mechanical rotation speed) of the sheet-fed offset rotary printing press 1 can also be construed as the rotation speed of the film transfer cylinder 20.

The control device 50 is also connected to the ultrasound sensor 16, unwinding reel driving detector 205, infeed roller driving detector 206, timer 207, rotary encoder 209, and photoelectric sensors PES1 to PES5. The unwinding reel driving detector 205 detects the rotation speed of the unwinding reel 17a supported by the unwinder device 18. The infeed roller driving detector 206 detects the rotation speed of the infeed roller 110. The rotary encoder 209 serves as a mechanical speed detection device which detects the mechanical rotation speed of the sheet-fed offset rotary printing press 1. The control device 50 is moreover connected to the unwinding reel driving motor 208, a conveyor belt driving motor 210, and an infeed motor 211. The unwinding reel driving motor 208 rotates the unwinding reel 17a. The conveyor belt driving motor 210 rotates the belt driving roller 124 to make the conveyor belt 127 travel. The infeed motor 211 drives the infeed roller 110.

3. Operation of Sheet-Fed Offset Rotary Printing Press 1

Sheets 2 supplied from the sheet feed device 3 onto the feeder board 11 one by one are transferred onto the impression cylinder 27 of the adhesive transfer unit 4 via the transfer cylinder 12. An adhesive formed on the plate cylinder 22 is transferred onto the blanket cylinder 23. When the sheet 2 passes between the blanket cylinder 23 and the impression cylinder 27, the adhesive is transferred from the blanket cylinder 23 onto the surface of the sheet 2, thereby printing an image of the adhesive on the sheet 2.

The sheet 2 having the image of the adhesive printed on it is transferred onto the impression cylinder 29 of the foil transfer unit 5 via the transfer cylinder 28. When the sheet 2 passes between the film transfer cylinder 20 and impression cylinder 29 of the foil transfer unit 5, the film 17 is pressed against the surface of the sheet 2 by the film transfer cylinder 20, thereby transferring the foil deposited on the film 17 to the portion where the adhesive is transferred onto the sheet 2. In this way, cold foil stamping is performed on the sheet 2.

The sheet 2 is then transferred onto the impression cylinder 15a of the printing unit 6a of the printing device 6 via the transfer cylinder 30. An image of ink formed on the plate cylinder 13a is transferred onto the blanket cylinder 14a. When the sheet 2 passes between the blanket cylinder 14a and the impression cylinder 15a, the ink is transferred from the impression cylinder 15a onto the surface of the sheet 2, thereby printing an image of the ink on the sheet 2. The subsequent printing units 6b to 6e of the printing device 6 similarly print images on the sheet 2 using inks of five colors.

The sheet 2 printed by the last printing unit 6e of the printing device 6 is irradiated with ultraviolet rays by the UV lamp 24 on the impression cylinder 15e. The ultraviolet curing adhesive and ink printed on the sheet 2 are cured with these ultraviolet rays. Upon the curing of the adhesive on the sheet 2, the foil adhered on the adhesive is fixed on the sheet 2 as well.

The sheet 2 printed by the printing device 6 is transferred onto the impression cylinder 36 of the varnish coating unit 7 via the transfer cylinders 31, 32, 33, 34, and 35. When the sheet 2 passes between the varnish supply cylinder 25 and the impression cylinder 36, its surface is coated with varnish.

The sheet 2 coated with varnish by the varnish coating unit 7 is transferred onto the transfer cylinder 38 of the drying unit 8 via the transfer cylinder 37, and irradiated with ultraviolet rays by the three UV lamps 26 on the transfer cylinder 38. The ultraviolet curing varnish applied on the sheet 2 is cured with these ultraviolet rays.

The sheet 2 irradiated with ultraviolet rays by the drying unit 8 is transferred onto the counter-cylinder 91 of the embossing unit 9 via the transfer cylinder 39. When the sheet 2 passes between the embossing cylinder 92 and the counter-cylinder 91, it is embossed.

The sheet 2 embossed by the embossing unit 9 is transferred to the gripper bar (not shown) of the delivery chain 99 on the delivery cylinder 97 of the sheet delivery device 10 via the two transfer cylinders 95 and 96, delivered, and stacked in a pile.

4. Operation of Foil Transfer Unit 5

The film 17 is unwound from the unwinder device 18 of the reel stand device 5a at a predetermined unwinding speed, and fed onto the film transfer cylinder 20 by the infeed roller 110 via the suction film feed device 120, aerodynamic storage device 100, and suction film delivery device 130 of the film storage device 5b. When the film 17 passes between the film transfer cylinder 20 and the impression cylinder 29, it is pressed by the film transfer cylinder 20, thereby transferring the foil deposited on the film 17 to the portion where the adhesive on the sheet 2 is printed. The film 17 having the foil transferred on it is rewound by the rewinder device 19 via a driving roller 111 and a plurality of guide rollers.

In the suction film feed device 120, the film 17 unwound from the unwinder device 18 is fed to the upper feed-side suction unit 121Up of the suction film feed device 120. In the upper feed-side suction unit 121Up, the suction blower B4 sucks air through the small holes 120a, thereby producing a suction force in the feed-side suction chambers 121d to 121f. Because this suction force acts on the surface of the breathable conveyor belt 127, the film 17 is drawn by suction onto the surface of the conveyor belt 127. Then, as the conveyor belt 127 travels by the belt driving roller 124, the film 17 is transported toward the lower feed-side suction unit 121Lo while being drawn by suction onto the surface of the conveyor belt 127. In the lower feed-side suction unit 121Lo as well, suction forces produced in the feed-side suction chambers 121a to 121c by the suction blowers B1 to B3, respectively, act on the surface of the conveyor belt 127, so the film 17 is transported toward the retraction device 102 of the aerodynamic storage device 100 while being drawn by suction onto the surface of the conveyor belt 127.

In this manner, in the suction film feed device 120, the conveyor belt 127 travels while the feed-side suction units 121Up and 121Lo draw by suction one side surface of the U-shaped portion of the film 17 via the conveyor belt 127, and one side surface of the U-shaped portion of the film 17 is transported to the aerodynamic storage device 100 while being held by the conveyor belt 127.

In the aerodynamic storage device 100, the air blow device 101 blows air vertically downwards toward the foil deposition surface, that is, the front surface of the film 17 transported from the suction film feed device 120, while the retraction device 102 draws by suction the back surface of the film 17 vertically downwards. With this operation, the arcuated portion of the U-shaped portion of the film 17 is formed and maintained in a non-contact state with the film 17 within the space in the aerodynamic storage device 100.

In the film storage unit 107, before the film 17 is formed into a U-shape, the static electricity removing device 141 removes static electricity generated on the back surface of the film 17. Also, when the film 17 is formed into a U-shape within the space in the aerodynamic storage device 100, the static electricity removing device 142 removes static electricity generated on the front surface of the film 17. This prevents bending and wrinkling of the film 17 due to static electricity.

In the suction film delivery device 130, the suction blowers B5 to B7 suck air through the small holes to produce suction forces in the delivery-side suction chambers 131a to 131c, respectively, thereby drawing by suction the film 17 onto the delivery-side guide surface 131g of the delivery-side suction chambers 131a to 131c. The film 17 is pulled vertically upwards only by rotation of the infeed roller 110. With this operation, the film 17 is delivered from the film storage unit 107 and supplied onto the film transfer cylinder 20 while the delivery-side suction chambers 131a to 131c hold the other side surface of the U-shaped portion of the film 17.

5. Control by Control Device 50

In the film storage unit 107, the driving of the infeed roller 110 and driving roller 111 is controlled so that the transport speed of the film 17 becomes equal to the conveyance speed of the sheet 2. In this embodiment, "the conveyance speed of the sheet 2" means the conveyance speed of the sheet 2 in the portion where a specific image is transferred onto the sheet 2, that is, the conveyance speed of the sheet 2 in the portion where the film transfer cylinder 20 is in contact with the impression cylinder 29. Hence, the control device 50 controls the infeed motor 211 of the infeed roller 110, and a driving motor (not shown) of the driving roller 111, based on the mechanical rotation speed detected by the rotary encoder 209.

In the unwinder device 18 as well, the driving of the unwinding reel driving motor 208 is controlled so that the feed speed of the film 17 becomes equal to the conveyance speed of the sheet 2. However, due to an error of the feed speed of the film 17 as the unwinding reel 17a itself is eccentric or deformed with respect to a perfect circle, the amount of storage of the film 17 in the film storage unit 107 changes, as shown in FIGS. 7 and 8. FIG. 7 shows a film 17 stored in a large amount while the arcuated portion of the U-shaped portion of the film 17 is present below the lower feed-side suction unit 121Lo and delivery-side suction unit 131. Also, FIG. 8 shows a film 17 stored in a small amount while the arcuated portion of the U-shaped portion of the film 17 is present in the upper portion of the lower feed-side suction unit 121Lo and delivery-side suction unit 131. In this manner, the position of the arcuated portion of the U-shaped portion of the film 17 changes with time during the operation of the sheet-fed offset rotary printing press 1.

Even if the amount of storage of the film 17 in the film storage unit 107 changes with time, especially the shape of the arcuated portion of the film 17 must be maintained so as to prevent bending and wrinkling of the film 17. Hence, based on the amount of storage of the film 17 in the film storage unit 107, that is, the position of the arcuated portion of the U-shaped portion of the film 17, the control device 50 controls the unwinding reel driving motor 208 to adjust the amount of unwinding of the film 17 from the unwinding reel 17a, thereby positioning the arcuated portion of the film 17 at a desired position, or controls the suction forces of the feed-side suction chambers 121a to 121c of the lower feed-side suction unit 121Lo and those in the delivery-side suction chambers 131a to 131c of the suction film delivery device 130, thereby reliably holding the two side surfaces of the U-shaped portion of the film 17.

5.1. Adjustment of Amount of Unwinding

Adjustment of the amount of unwinding of the film 17 from the unwinder device 18 by the control device 50 will be described below.

Figure 15:
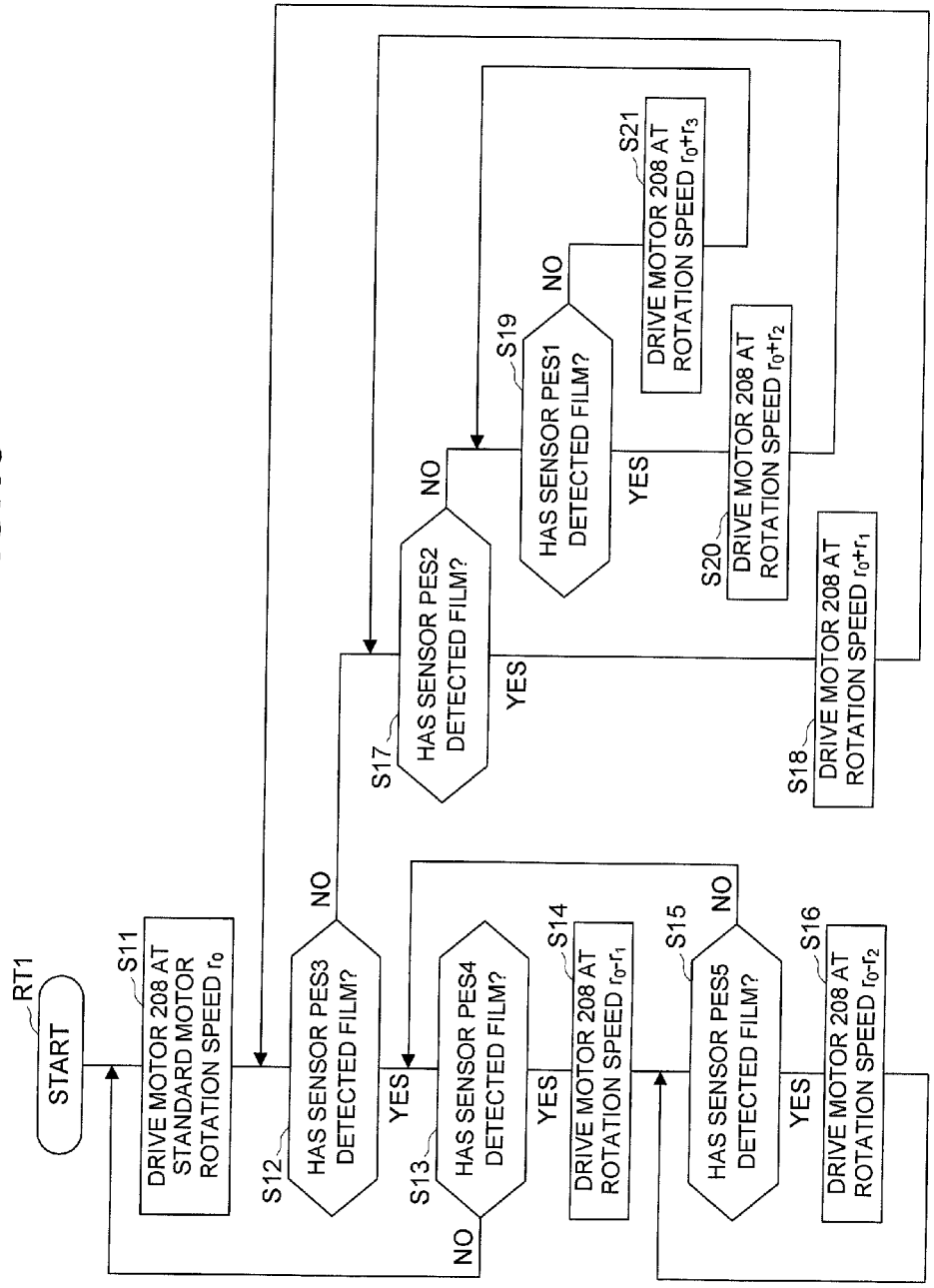
FIG. 15 is a flowchart showing the procedure of an unwinding amount control process.

The control device 50 controls the unwinding reel driving motor 208 of the unwinder device 18 to adjust the amount of unwinding of the film 17 so that the bottom portion, that is, the arcuated portion of the U-shaped portion of the film 17 in the film storage unit 107 is positioned between the feed-side suction chamber 121c and the delivery-side suction chamber 131c or, more precisely, between the photoelectric sensors PES3 and PES4. This control is performed in accordance with a routine RT1 shown in FIG. 15.

First, the motor control unit 510 of the control device 50 drives the unwinding reel driving motor 208 at a standard motor rotation speed $r_0$ (step S1). The standard motor rotation speed $r_0$ means the reference rotation speed of the unwinding reel driving motor 208, which is calculated based on the diameter (or radius) of the unwinding reel 17a calculated based on the detection result obtained by the ultrasound sensor 16, and the operating speed of the sheet-fed offset rotary printing press 1 detected by the rotary encoder 209. Therefore, the standard motor rotation speed $r_0$ changes depending on the diameter of the unwinding reel 17a, and the operating speed of the sheet-fed offset rotary printing press 1. Upon the driving of the unwinding reel driving motor 208 at the standard motor rotation speed $r_0$, the film 17 is unwound from the unwinding reel 17a at the same speed as the conveyance speed of the sheet 2.

The motor control unit 510 determines whether the film 17 is detected by the photoelectric sensor PES3, based on the output from the photoelectric sensor PES3 (step S12). If it is determined in step S12 that the film 17 is detected by the photoelectric sensor PES3 (YES in step S12), the U-shaped portion of the film 17 is present at least between the feed-side suction chamber 121b and the delivery-side suction chamber 131b.

In this case, the motor control unit 510 determines whether the film 17 is detected by the photoelectric sensor PES4, based on the output from the photoelectric sensor PES4 (step S13). If it is determined in step S13 that the film 17 is not detected by the photoelectric sensor PES4 (NO in step S13), the arcuated portion of the U-shaped portion of the film 17 is positioned at an appropriate position between the photoelectric sensors PES3 and PES4, one side surface (feed-side side surface) of the U-shaped portion of the film 17 is tightly drawn by suction within the range of the feed-side suction chambers 121a and 121b, and the other side surface (delivery-side side surface) of the U-shaped portion of the film 17 is tightly drawn by suction within the range of the delivery-side suction chambers 131a and 131b. In this case, the process returns again to step S11, in which the motor control unit 510 continues to drive the unwinding reel driving motor 208 at the standard motor rotation speed $r_0$, that is, the reference rotation speed.

In contrast to this, if it is determined in step S13 that the film 17 is detected by the photoelectric sensor PES4 (YES in step S13), it is probable that the arcuated portion of the U-shaped portion of the film 17 is positioned below the boundary between the feed-side suction chamber 121c and the delivery-side suction chamber 131c, so the arcuated portion is positioned at an inappropriate position, as shown in FIG. 7. This means that the arcuated portion is unstable or will be unstable.

Hence, the motor control unit 510 drops the rotation speed of the unwinding reel driving motor 208 by a predetermined rotation speed $r_1$ from the standard motor rotation speed $r_0$ (step S14). With this operation, the unwinding reel driving motor 208 is driven at a rotation speed $r_0-r_1$, so the amount of unwinding of the film 17 from the unwinding reel 17a of the unwinder device 18 decreases.

The motor control unit 510 determines whether the film 17 is detected by the photoelectric sensor PES5, based on the output from the photoelectric sensor PES5 (step S15). If it is determined in step S15 that the film 17 is not detected by the photoelectric sensor PES5 (NO in step S15), the process returns to step S13 again.

In contrast to this, if it is determined in step S15 that the film 17 is detected by the photoelectric sensor PES5 (YES in step S15), it is probable that the U-shaped portion of the film 17 has reached the vicinity of the retraction device 102 or is in contact with the retraction device 102 upon passing between the feed-side suction chamber 121c and the delivery-side suction chamber 131c, so the arcuated portion of the U-shaped portion of the film 17 is positioned at an inappropriate position. This means that the arcuated portion is unstable or will be unstable.

Hence, the motor control unit 510 drops the rotation speed of the unwinding reel driving motor 208 by a predetermined rotation speed $r_2$ from the standard motor rotation speed $r_0$ (step S16). With this operation, the unwinding reel driving motor 208 is driven at a rotation speed $r_0-r_2$, so the amount of unwinding of the film 17 from the unwinding reel 17a of the unwinder device 18 further decreases from that in step S14.

The process then returns to step S15 again. This means that the motor control unit 510 drives the unwinding reel driving motor 208 at the rotation speed $r_0-r_2$ until the film 17 is no longer detected by the photoelectric sensor PES5.

On the other hand, if it is determined in step S12 that the film 17 is not detected by the photoelectric sensor PES3 (NO in step S12), it is probable that the U-shaped portion of the film 17 is absent between the feed-side suction chamber 121b and the delivery-side suction chamber 131b, so the arcuated portion of the U-shaped portion of the film 17 is positioned at an inappropriate position. This means that the arcuated portion is unstable or will be unstable.

In this case, the motor control unit 510 determines whether the film 17 is detected by the photoelectric sensor PES2, based on the output from the photoelectric sensor PES2 (step S17). If it is determined in step S17 that the film 17 is detected by the photoelectric sensor PES2 (YES in step S17), the U-shaped portion of the film 17 is present at least between the feed-side suction chamber 121a and the delivery-side suction chamber 131a, so the arcuated portion of the U-shaped portion of the film 17 is positioned at an inappropriate position. This means that the arcuated portion is unstable or will be unstable.

Hence, the motor control unit 510 raises the rotation speed of the unwinding reel driving motor 208 by the predetermined rotation speed $r_1$ from the standard motor rotation speed $r_0$ (step S18). With this operation, the unwinding reel driving motor 208 is driven at a rotation speed $r_0+r_1$, so the amount of unwinding of the film 17 from the unwinding reel 17a of the unwinder device 18 increases. The process then returns to step S12 again.

In contrast to this, if it is determined in step S17 that the film 17 is not detected by the photoelectric sensor PES2 (NO in step S17), it is probable that the U-shaped portion of the film 17 is absent between the feed-side suction chamber 121a and the delivery-side suction chamber 131a.

In this case, the motor control unit 510 determines whether the film 17 is detected by the photoelectric sensor PES1, based on the output from the photoelectric sensor PES1 (step S19). If it is determined in step S19 that the film 17 is detected by the photoelectric sensor PES1 (YES in step S19), the U-shaped portion of the film 17 is present at least between the feed-side suction chamber 121a and the delivery-side suction chamber 131a, so the arcuated portion of the U-shaped portion of the film 17 is positioned at an inappropriate position. This means that the arcuated portion is unstable or will be unstable.

Hence, the motor control unit 510 raises the rotation speed of the unwinding reel driving motor 208 by the predetermined rotation speed $r_2$ from the standard motor rotation speed $r_0$ (step S20). With this operation, the unwinding reel driving motor 208 is driven at a rotation speed $r_0+r_2$, so the amount of unwinding of the film 17 from the unwinding reel 17a of the unwinder device 18 further increases from that in step S18. The process then returns to step S17 again.

In contrast to this, if it is determined in step S19 that the film 17 is not detected by the photoelectric sensor PES1 (NO in step S19), the U-shaped portion of the film 17 is absent between the feed-side suction chamber 121a and the delivery-side suction chamber 131a as well.

In this case, the motor control unit 510 raises the rotation speed of the unwinding reel driving motor 208 by a predetermined rotation speed $r_3$ from the standard motor rotation speed $r_0$ (step S21). With this operation, the unwinding reel driving motor 208 is driven at a rotation speed $r_0+r_3$, so the amount of unwinding of the film 17 from the unwinding reel 17a of the unwinder device 18 further increases from those in steps S18 and S20.

The process then returns to step S19 again. This means that the motor control unit 510 drives the unwinding reel driving motor 208 at the rotation speed $r_0+r_3$ until the film 17 is detected by the photoelectric sensor PES1. Note that $r_1$, $r_2$, and $r_3$ satisfy a relationship: $r_1 < r_2 < r_3$.

In this manner, the motor control unit 510 drives the unwinding reel driving motor 208 in six steps of the rotation speeds $r_0$, $r_0-r_1$, $r_0-r_2$, $r_0+r_1$, $r_0+r_2$, and $r_0+r_3$ to control the amount of film storage so that one side surface and the other side surface of the U-shaped portion of the film 17 in the film storage unit 107 are tightly drawn by suction to the feed-side suction chamber and the delivery-side suction chamber, respectively. With this operation, the bottom portion, that is, the arcuated portion of the U-shaped portion of the film 17 is positioned at an appropriate position, that is, the position between the photoelectric sensors PES3 and PES4, one side surface of the U-shaped portion of the film 17 is drawn by suction to the feed-side suction chambers 121a and 121b, and the other side surface of the U-shaped portion of the film 17 is drawn by suction to the delivery-side suction chambers 131a and 131b.

Note that the motor control unit 510 controls the belt driving roller 124 so that the traveling speed of the conveyor belt 127 always becomes slightly higher than the speed at which the film 17 is unwound from the unwinding reel 17a. With this operation, an appropriate tension acts on the film 17 transported from the unwinding reel 17a to the suction film feed device 120, thereby preventing bending and wrinkling of the film 17 and even tearing of the film 17 and cracking of the foil on the film 17 due to too much tension.

5.2. Adjustment of Suction Forces

Adjustment of the suction forces of the feed-side suction chambers 121a to 121f and delivery-side suction chambers 131a to 131c by the control device 50 will be described below.

5.2.1. Adjustment of Suction Forces Based on Initial Conditions

Adjustment of the suction forces based on the initial conditions will be described first.

The suction forces of the feed-side suction chambers 121a to 121f and delivery-side suction chambers 131a to 131c are adjusted based on the width of the film 17 and the operating speed (mechanical rotation speed) of the sheet-fed offset rotary printing press 1, as shown in Table 1.

TABLE 1

Suction Force Control Patterns Corresponding to Parameters of Initial Conditions and Post-operation Conditions

| | Parameter | | Suction Force |
|---|---|---|---|
| Initial Conditions | Film Width | Large | High |
| | | Small | Low |
| | Mechanical Rotation Speed | High | High |
| | | Low | Low |
| Post-operation Conditions | Variation Width | Large | High |
| | | Small | Low |
| | Variation Rate | High | High |
| | | Low | Low |

If the film width is larger than a reference value, the suction force is set high. Upon this operation, a wide, heavy film 17 can reliably be held by suction using high suction forces produced in the delivery-side suction chambers 131a to 131c and conveyor belt 127.

On the other hand, if the film width is smaller than the reference value, the suction force is set low. A narrow, light film 17 is pressed against the feed-side suction chambers 121a to 121c and delivery-side suction chambers 131a to 131c by air blown from the air blow device 101 of the aerodynamic storage device 100. Upon this operation, a narrow, light film 17 can reliably be held by suction by the conveyor belt 127 and delivery-side suction chambers 131a to 131c even using low suction forces.

If the mechanical rotation speed set by the operator in accordance with the type of print product is higher than a preset speed, the suction force is set high. Upon this operation, even if the transport speed of the film 17 rises with an increase in mechanical rotation speed, one side surface and the other side surface of the U-shaped portion of the film 17 can reliably be held by suction by the conveyor belt 127 and delivery-side suction chambers 131a to 131c using high suction forces.

On the other hand, if the mechanical rotation speed set by the operator is lower than the preset speed, the suction force is set low. This makes it possible to prevent the suction forces that draw by suction the other side surface of the U-shaped portion of the film 17 to the delivery-side suction chambers 131a to 131c from acting as too much resistance in transporting the film 17 by the infeed roller 110.

Note that when the film width is small, the position of the film 17 in the widthwise direction often shifts to either the left or right of the feed-side suction chambers 121a to 121f and delivery-side suction chambers 131a to 131c divided into two right and left equal parts. In such a case, a suction control unit 512 of the control device 50 stops the suction of a suction chamber in which the film 17 is absent to suppress wasteful power consumption. Such a shift in position of the film 17 can be determined from the film position 204 input to the setting value input unit 201 shown in FIG. 11.

The suction control unit 512 of the control device 50 determines the initial suction forces in the feed-side suction chambers 121a to 121f and delivery-side suction chambers 131a to 131c, based on the combination of the suction force based on the film width and the suction force based on the mechanical rotation speed, as shown in Table 2.

TABLE 2

Suction Force Control Patterns Based on Combination of Parameters of Initial Conditions

| Parameter | | Suction Force | | | |
|---|---|---|---|---|---|
| Initial Conditions | Film Width | High | High | Low | Low |
| | Mechanical Rotation Speed | High | Low | High | Low |
| Magnitude of Suction Force | | Large | Middle | Middle | Small |

"Large," "Middle," and "Small" in Table 2 indicate the magnitudes of the suction forces. The magnitudes of the suction forces satisfy a relationship: Large>Middle>Small.

If the film width is large and the suction force is "High," and the mechanical rotation speed is high and the suction force is "High," the optimum magnitude of the suction force is "Large." If the film width is large and the suction force is "High" as well, but the mechanical rotation speed is low and the suction force is "Low," the optimum magnitude of the suction force is "Middle."

However, if the film width is small and the suction force is "Low," and the mechanical rotation speed is high and the suction force is "High," the optimum magnitude of the suction force is "Middle." If the film width is small and the suction force is "Low" as well, but the mechanical rotation speed is low and the suction force is "Low," the optimum magnitude of the suction force is "Small."

The suction force control unit 520 controls the variable airflow valves V1P to V6P and V1E to V3E and/or the suction blowers B1 to B4 and B5 to B7 corresponding to the feed-side suction chambers 121a to 121f and delivery-side suction chambers 131a to 131c, respectively, so as to obtain the magnitude of the suction force determined based on the film width and mechanical rotation speed in the above-mentioned way. Upon this operation, the two side surfaces of the U-shaped portion of the film 17 in the film storage unit 107 can reliably be drawn by suction, thereby stabilizing the arcuated portion of this U-shaped portion.

Although the suction force control unit 520 controls the suction forces of the feed-side suction unit 121 and delivery-side suction unit 131 based on both the film width and the mechanical rotation speed in this embodiment, it can also control the suction forces of the feed-side suction unit 121 and delivery-side suction unit 131 based on only one of the film width and the mechanical rotation speed, as a matter of course.

5.2.2. Adjustment of Suction Forces During Machine Operation

Adjustment of the suction forces during the machine operation will be described below.

When the operation of the sheet-fed offset rotary printing press 1 starts, the amount of storage of the film 17 in the film storage unit 107 changes with time. Hence, the control device 50 controls the rotation speed of the unwinding reel driving motor 208 of the unwinder device 18 so as to position the arcuated portion of the U-shaped portion of the film 17 at an appropriate position, as described above. Further, if the change in amount of storage of the film 17 is so large that the state of the U-shaped portion of the film 17 is unstable, the control device 50 changes the suction forces of the suction film feed device 120 and suction film delivery device 130 from the set values based on the initial conditions.

A fluctuation in amount of storage of the film 17, that is, a fluctuation in position of the U-shaped portion of the film 17 in the film storage unit 107 is evaluated based on the "Variation Rate" and the "Variation Width."

The "Variation Rate" means the amount of storage change of the film 17 in the film storage unit 107 per unit time, that is, the speed at which the position of the arcuated portion of the U-shaped portion of the film 17 ascends or descends.

The "Variation Width" means the amount of change in storage of the film 17 in the film storage unit 107, that is, the amount of displacement of the position of the arcuated portion of the U-shaped portion of the film 17.

If the amount of storage of the film 17 changes so rapidly that the variation rate is high, or the position of the arcuated portion of the U-shaped portion of the film 17 changes so considerably if not rapidly that the variation width is large, it is probable that the state of the U-shaped portion of the film 17 in the film storage unit 107 will be unstable. This makes it necessary to control the suction forces of the suction film feed device 120 and suction film delivery device 130.

5.2.2.1. Adjustment of Suction Forces Corresponding to Variation Rate

Adjustment of the suction forces corresponding to the variation rate will be described first.

The variation rate detection unit 320 obtains the amount of increase or decrease of the film 17 stored in the film storage unit 107, based on the difference between the amount of unwinding of the film 17 from the unwinding reel 17*a* and the amount of delivery of the film 17 from the film storage unit 107 within the time taken for the film transfer cylinder 20 to rotate through 360°, and divides this amount of increase or decrease by the time taken for the film transfer cylinder 20 to rotate through 360°, thereby calculating the amount of storage change of the film 17 in the film storage unit 107 per unit time, that is, the variation rate.

The variation rate is calculated by the variation rate calculation unit 321 of the variation rate detection unit 320, based on the outputs from the ultrasound sensor 16, unwinding reel driving detector 205, infeed roller driving detector 206, and rotary encoder 209. A method of calculating the variation rate will be described in more detail below.

First, the diameter (or radius) of the unwinding reel 17*a* is calculated based on the output from the ultrasound sensor 16. Also, the time taken for the film transfer cylinder 20 to rotate through 360° is calculated based on the operating speed of the sheet-fed offset rotary printing press 1 detected by the rotary encoder 209. The amount of unwinding of the film 17 within the time taken for the film transfer cylinder 20 to rotate through 360° is calculated based on the calculated time, the calculated diameter (or radius) of the unwinding reel 17*a*, and the rotation speed of the unwinding reel 17*a* detected by the unwinding reel driving detector 205.

The amount of delivery of the film 17 from the film storage unit 107 within the time taken for the film transfer cylinder 20 to rotate through 360° is calculated based on the rotation speed of the infeed roller 110 detected by the infeed roller driving detector 206, the time taken for the film transfer cylinder 20 to rotate through 360°, and the radius (or diameter) of the infeed roller 110.

The amount of increase or decrease in amount of storage of the film 17 in the aerodynamic storage device 100 is obtained by calculating the difference between the amount of unwinding of the film 17 and the amount of delivery of the film 17 within the time taken for the film transfer cylinder 20 to rotate through 360°. This amount of increase or decrease is divided by the time taken for the film transfer cylinder 20 to rotate through 360° to calculate the variation rate.

The suction force control unit 520 of the control device 50 determines the suction forces of the feed-side suction chambers 121*a* to 121*f* and delivery-side suction chambers 131*a* to 131*c* in accordance with Table 1 based on the variation rate calculated by the variation rate calculation unit 321. First, the suction force control unit 520 compares the calculated variation rate with a reference value for the variation rate, which is determined in advance. If it is determined as a result of a comparison that the calculated variation rate is higher than the reference value, the suction force is set "High." Upon this operation, one side surface and the other side surface of the U-shaped portion of the film 17 are reliably held by suction by the conveyor belt 127 and delivery-side suction chambers 131*a* to 131*c* using high suction forces. In contrast to this, if the calculated variation rate is lower than the reference value, the state of the U-shaped portion of the film 17 is stable, so the suction force is set "Low" to maintain the U-shaped portion of the film 17 stable.

5.2.2.2. Adjustment of Suction Forces Corresponding to Variation Width

Adjustment of the suction forces corresponding to the variation width will be described next.

The variation width detection unit 330 detects the maximum amount of movement of the arcuated portion of the U-shaped portion of the film 17 in the film storage unit 107, that is, the variation width, based on the detection results obtained by the photoelectric sensors PES1 to PES5. Details of this operation will be described in more detail hereinafter.

First, after the timer 207 measures a predetermined time, the variation width calculation unit 331 of the variation width detection unit 330 detects the presence/absence of a film 17 by the photoelectric sensors PES1 to PES5, thereby obtaining the position of the arcuated portion of the U-shaped portion of the film 17 based on the detection result. In a state shown in, for example, FIG. 7, the photoelectric sensors PES1 to PES4 have detected the film 17, but the photoelectric sensor PES5 has not detected the film 17. This reveals that the arcuated portion of the U-shaped portion of the film 17 is present between the photoelectric sensors PES4 and PES5. After the timer 207 further measures a predetermined time, the variation width calculation unit 331 similarly detects the position of the arcuated portion of the U-shaped portion of the film 17. In a state shown in, for example, FIG. 8, the arcuated portion of the U-shaped portion of the film 17 is present between the photoelectric sensors PES1 and PES2. In this manner, the positions of the arcuated portion of the U-shaped portion of the film 17 are detected a plurality of times at a predetermined time interval measured by the timer 207.

The variation width calculation unit 331 calculates the variation width from the highest and lowest positions among the positions of the arcuated portion detected a plurality of times. For example, score 0 is set when the arcuated portion of the U-shaped portion of the film 17 is present at a reference position, that is, the position between the photoelectric sensors PES3 and PES4, score −1 is set when it is present between the photoelectric sensors PES4 and PES5, score −2 is set when it is present below the photoelectric sensor PES5, score 1 is set when it is present between the photoelectric sensors PES2 and PES3, score 2 is set when it is present between the photoelectric sensors PES1 and PES2, and score 3 is set when it is present above the photoelectric sensor PES1. More specifically, score −1 is assigned to the state shown in FIG. 7, and score 2 is assigned to the state shown in FIG. 8. The value obtained by subtracting the minimum score from the maximum score among the scores based on the positions of the arcuated portion of the U-shaped portion of the film 17 detected a plurality of times is determined as the variation width.

The suction force control unit 520 of the control device 50 determines the suction forces of the feed-side suction chambers 121a to 121f and delivery-side suction chambers 131a to 131c in accordance with Table 1 based on the variation width detected by the variation width detection unit 330. First, the suction force control unit 520 compares the detected variation width with a reference value for the variation width, which is determined in advance. In the above-mentioned example, upon defining the reference value as 3, the suction force control unit 520 determines that the variation width is small for 3 or less, and the variation width is large for more than 3. More specifically, when the scores obtained by five measurement operations are 0, −1, 0, 1, and 2, the maximum score is 2 and the minimum score is −1. In this case, (Maximum Score)−(Minimum Score)=3, so the suction force control unit 520 determines that the variation width is small.

If the variation width is large, the suction force control unit 520 sets the suction force "High", as shown in Table 1. Upon this operation, one side surface and the other side surface of the U-shaped portion of the film 17 are reliably held by suction by the conveyor belt 127 and delivery-side suction chambers 131a to 131c using high suction forces. In contrast to this, if the variation width is small, the state of the U-shaped portion of the film 17 is stable, so the suction force is set "Low" to maintain the U-shaped portion of the film 17 stable.

5.2.2.3. Adjustment of Suction Forces Corresponding to Combination of Variation Rate and Variation Width Moreover, the suction control unit 512 of the control device 50 determines the suction forces of the feed-side suction chambers 121a to 121f and delivery-side suction chambers 131a to 131c, based on the combination of the suction force based on the variation rate and that based on the variation width, as shown in Table 3.

TABLE 3

Suction Force Control Patterns Based on Combination of Parameters of Post-operation Conditions

| Parameter | | Suction Force | | | |
|---|---|---|---|---|---|
| Post-operation Conditions | Variation Width | High | Low | Low | Low |
| | Variation Rate | High | Low | High | Low |
| Magnitude of Suction Force | | Large | Middle | Middle | Small |

"Large," "Middle," and "Small" in Table 3 indicate the magnitudes of the suction forces. The magnitudes of the suction forces satisfy a relationship: Large>Middle>Small.

If the variation width is large and the suction force is "High," and the variation rate is high and the suction force is "High," the optimum magnitude of the suction force is set "Large." If the variation width is large and the suction force is "High" as well, but the variation rate is low and the suction force is "Low," the optimum magnitude of the suction force is "Middle."

However, if the variation width is small and the suction force is "Low," and the variation rate is high and the suction force is "High," the optimum magnitude of the suction force is "Middle." If the variation width is small and the suction force is "Low" as well, but the variation rate is low and the suction force is "Low," the optimum magnitude of the suction force is "Small."

The suction force control unit 520 controls the variable airflow valves V1P to V6P and V1E to V3E and/or the suction blowers B1 to B4 and B5 to B7 corresponding to the feed-side suction chambers 121a to 121f and delivery-side suction chambers 131a to 131c, respectively, so as to obtain the magnitude of the suction force determined based on the variation rate and variation width in the above-mentioned way. Upon this operation, even if the change in amount of storage of the film 17 in the film storage unit 107 is large, the two side surfaces of the U-shaped portion of the film 17 in the film storage unit 107 can reliably be drawn by suction, thereby stabilizing the arcuated portion of this U-shaped portion.

Note that the suction force control unit 520 can also control the suction forces of the feed-side suction unit 121 and delivery-side suction unit 131 based on only one of the variation rate and the variation width, as a matter of course.

When either the variation rate or the variation width exceeds a preset limit value, the control device 50 emergently stops the sheet-fed offset rotary printing press 1.

5.2.3. Individual Control of Suction Forces

Figure 16:
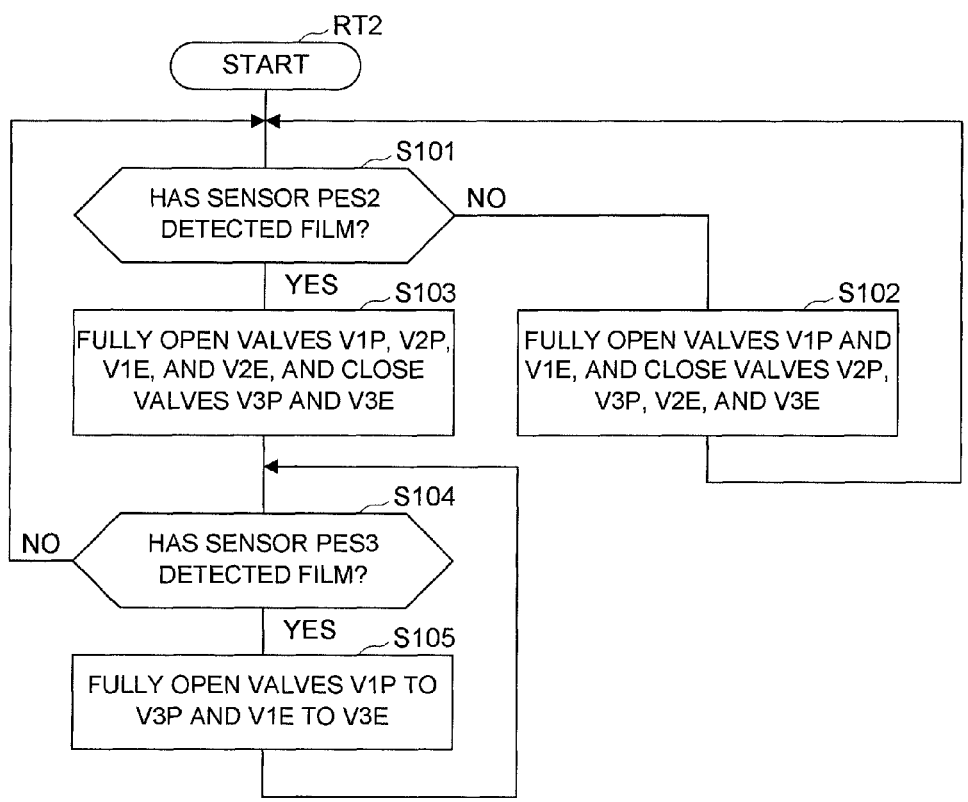
FIG. 16 is a flowchart showing the procedure of a suction force control process.

The suction force control unit 520 of the control device 50 can individually control the suction forces of the feed-side suction chambers 121a to 121c and delivery-side suction chambers 131a to 131c, based on the detection result obtained by the film position detection unit 310. That is, when the change in amount of storage of the film 17 in the film storage unit 107 is so small that the U-shaped portion of the film 17 is stable, the suction force control unit 520 individually controls the opening/closing of the feed-side variable airflow valves V1P to V3P of the feed-side suction chambers 121a to 121c, respectively, and the delivery-side variable airflow valves V1E to V3E of the delivery-side suction chambers 131a to 131c, respectively, in accordance with the position of the arcuated portion of the U-shaped portion obtained based on the detection results obtained by the photoelectric sensors PES1 to PES5. This control is performed in accordance with a routine RT2 shown in FIG. 16. Note that the routine RT2 is executed assuming that the film 17 is detected by the photoelectric sensor PES1.

First, the suction force control unit 520 determines whether the film 17 is detected by the photoelectric sensor PES2 (step S101).

If it is determined in step S101 that the film 17 is not detected by the photoelectric sensor PES2 (NO in step S101), the suction force control unit 520 controls to fully open the feed-side variable airflow valve V1P of the feed-side suction chamber 121a and the delivery-side variable airflow valve V1E of the delivery-side suction chamber 131a to make their suction forces maximally act on the film 17, and close the feed-side variable airflow valves V2P and V3P of the feed-side suction chambers 121b and 121c, respectively, and the delivery-side variable airflow valves V2E and V3E of the delivery-side suction chambers 131b and 131c, respectively, to keep their suction forces low (step S102).

Upon this operation, one side surface and the other side surface of the U-shaped portion of the film 17 in the film storage unit 107 are reliably drawn by suction to the feed-side suction chamber 121a and delivery-side suction chamber 131a, respectively, so the arcuated portion of this U-shaped portion becomes stable. On the other hand, the feed-side suction chambers 121b and 121c and delivery-side suction chambers 131b and 131c in which the film 17 is absent stand by to immediately produce strong suction forces where necessary without wasteful suction operations. The process then returns to step S101 again.

If it is determined in step S101 that the film 17 is detected by the photoelectric sensor PES2 (YES in step S101), it is probable that the U-shaped portion of the film 17 is present between the feed-side suction chamber 121a and the delivery-side suction chamber 131a, and crosses over the boundary between the feed-side suction chamber 121b and the delivery-side suction chamber 131b.

Hence, the suction force control unit 520 controls to fully open the feed-side variable airflow valves V1P and V2P of the feed-side suction chambers 121a and 121b, respectively, and the delivery-side variable airflow valves V1E and V2E of the delivery-side suction chambers 131a and 131b, respectively, to make their suction forces maximally act on the film 17, and close the feed-side variable airflow valve V3P of the feed-side suction chamber 121c and the delivery-side variable airflow valve V3E of the delivery-side suction chamber 131c to keep their suction forces low (step S103).

Upon this operation, one side surface and the other side surface of the U-shaped portion of the film 17 in the film storage unit 107 are reliably drawn by suction to the feed-side suction chambers 121a and 121b and delivery-side suction chambers 131a and 131b, respectively, so the arcuated portion of this U-shaped portion becomes stable. On the other hand, the feed-side suction chamber 121c and delivery-side suction chamber 131c in which the film 17 is absent stand by to immediately produce strong suction forces where necessary without wasteful suction operations.

The suction force control unit 520 determines whether the film 17 is detected by the photoelectric sensor PES3 (step S104). If it is determined in step S104 that the film 17 is not detected by the photoelectric sensor PES3 (NO in step S104), the process returns again to step S101, in which the above-mentioned processes are repeated.

In contrast to this, if it is determined in step S104 that the film 17 is detected by the photoelectric sensor PES3 (YES in step S104), it is probable that the U-shaped portion of the film 17 is present between the feed-side suction chambers 121a and 121b and the delivery-side suction chambers 131a and 131b, and crosses over the boundary between the feed-side suction chamber 121c and the delivery-side suction chamber 131c.

Hence, the suction force control unit 520 fully opens the feed-side variable airflow valves V1P to V3P of the feed-side suction chambers 121a to 121c, respectively, and the delivery-side variable airflow valves V1E to V3E of the delivery-side suction chambers 131a to 131c, respectively, to make all their suction forces maximally act on the film 17 (step S105).

Upon this operation, one side surface and the other side surface of the U-shaped portion of the film 17 in the film storage unit 107 are reliably drawn by suction to the feed-side suction chambers 121a to 121c and delivery-side suction chambers 131a to 131c, respectively, so the arcuated portion of this U-shaped portion becomes stable. The process then returns again to step S104, in which the above-mentioned processes are repeated.

As described above, if it is determined in step S104 that the film 17 is not detected by the photoelectric sensor PES3 (NO in step S104), the process returns to step S101, and if it is determined in step S101 that the film 17 is not detected by the photoelectric sensor PES2 (NO in step S101), the process returns to step S102, in which the above-mentioned processes are repeated. Hence, even if the bottom portion of the U-shaped portion in the film storage unit 107 ascends or descends due to a change in length of this U-shaped portion, suction forces can be continuously applied to the position where the film 17 is present while suppressing unnecessary suction operations.

Note that the suction force control unit 520 can control to adjust the outputs from the suction blowers B1 to B3 and B5 to B7 in synchronism with the opening/closing operations of the feed-side variable airflow valves V1P to V3P and delivery-side variable airflow valves V1E to V3E, respectively. The suction force control unit 520 may also control to adjust the suction force of each suction chamber using only the suction blowers B1 to B3 and B5 to B7.

6. Effects of Embodiment

In this embodiment, the film storage unit 107 is disposed vertically above the film transfer cylinder 20, and the unwinder device 18 and rewinder device 19 are disposed vertically above the film storage unit 107. The unwinder device 18 and rewinder device 19 are vertically aligned with each other. With this arrangement, the large-diameter unwinding reel 17a and the rewinding reel 17b can be mounted in the unwinder device 18 and rewinder device 19, respectively, from above the foil transfer unit 5. This makes it possible to reduce the frequency of replacement of the unwinding reel 17a and rewinding reel 17b in the unwinder device 18 and rewinder device 19, respectively. Also, even when the large-diameter unwinding reel 17a and the rewinding reel 17b are mounted in the unwinder device 18 and rewinder device 19, respectively, given operation spaces can be ensured on the front and rear sides of the unwinder device 18 and rewinder device 19. This, in turn, makes it possible to facilitate the adjustment operations, and improve the operability of the apparatus.

In this embodiment, in the film storage unit 107, the suction film feed device 120 is disposed on the side on which the film 17 is supplied from the unwinder device 18, and the suction film delivery device 130 is disposed on the side on which the film 17 is delivered by the infeed roller 110. The film 17 is transported as one side surface of its U-shaped portion is held by suction by the conveyor belt 127 of the suction film feed device 120. Also, the other side surface of the U-shaped portion of the film 17 is held by suction by the delivery-side suction unit 131 of the suction film delivery device 130, and reliably pulled out by the infeed roller 110. Therefore, even if the film 17 is transported at high speed or the amount of storage of the film 17 changes, the arcuated portion of the U-shaped portion of the film 17 can be maintained to prevent bending and wrinkling of the film 17.

In this embodiment, in the film storage unit 107, the conveyor belt 127 in the suction film feed device 120 transports one side surface of the U-shaped portion of the film 17, while only the infeed roller 110 pulls out the other side surface of the film 17. That is, the suction film delivery device 130 does not have components corresponding to the conveyor belt 127 and the rollers 123 to 126 of the suction film feed device 120. When using the conveyor belt to also transport the other side surface of the U-shaped portion of the film 17, speed control of the conveyor belt is required in addition to the control of the infeed roller 110. Since the rotation of the infeed roller 110 is controlled so that the traveling speed of the film 17 matches the conveyance speed of the sheet 2, it is difficult to match the speed of the conveyor belt with the rotation of the infeed roller 110. If the speed of the conveyor belt does not match the rotation of the infeed roller 110, the tension of the film 17 becomes unstable, thus causing wrinkling and bending of the film 17. To eliminate tension instability, in this embodiment, no conveyor belt is disposed in the suction film delivery device 130, and the film 17 is pulled out by only the infeed roller 110.

In this embodiment, the control device 50 optimally controls the suction force of the feed-side suction unit 121 of the suction film feed device 120, and that of the delivery-side suction unit 131 of the suction film delivery device 130, in accordance with the initial conditions or the storage state of the film 17 during the operation of the sheet-fed offset rotary printing press 1. Upon this operation, the U-shaped portion of the film 17 is reliably held by suction by the conveyor belt 127 and delivery-side suction unit 131, thereby preventing bending and wrinkling of the film 17.

In this embodiment, the control device 50 controls the unwinding reel driving motor 208 which rotates the unwinding reel 17a, in accordance with the position of the bottom portion of the U-shaped portion of the film 17. This makes it possible to adjust the amount of unwinding of the film 17 from the unwinding reel 17a so as to position the U-shaped portion of the film 17 at an appropriate position. This, in turn, makes it possible to maintain the arcuated portion of the U-shaped portion of the film 17, thereby preventing bending and wrinkling of the film 17.

For example, when the U-shaped portion of the film 17 is positioned at the upper position, as shown in FIG. 8, so the two side surfaces of the U-shaped portion of the film 17 are only slightly drawn by suction to the feed-side suction chamber 121a and delivery-side suction chamber 131a, respectively, the suction forces produced by the suction chambers 121a and 131a may be insufficient to maintain the film 17 in a stable U shape.

However, in this embodiment, only the feed-side suction unit 121Lo of the suction film feed device 120 and the delivery-side suction unit 131 of the suction film delivery device 130 are arranged on the opposite sides of the aerodynamic storage device 100. In other words, the upper feed-side suction unit 121Up provided on the upstream side in the direction in which the film 17 is transported projects more to the upstream side, in the direction in which the film 17 is transported, than the lower feed-side suction unit 121Lo and delivery-side suction unit 131. Hence, even in the above-mentioned case, the film 17 is held by suction not only by the feed-side suction chamber 121a but also by the feed-side suction chambers 121d to 121f of the upper feed-side suction unit 121Up provided upstream of the feed-side suction chamber 121a in the direction in which the film 17 is transported. Therefore, even if the film 17 cannot sufficiently be held only by the suction forces produced by the lower feed-side suction unit 121Lo and delivery-side suction unit 131, it is reliably held by suction by the conveyor belt 127 within the range of the upper feed-side suction unit 121Up, and reliably transported to the lower feed-side suction unit 121Lo. Also, the arcuated portion of the U-shaped portion of the film 17 having a variable position becomes table. This makes it possible to prevent bending and wrinkling of the film 17.

7. Other Embodiments

In the above-mentioned embodiment, the film transfer apparatus according to the present invention is applied to the foil transfer unit 5 to produce a good aesthetic effect using a foil transfer process called cold foil stamping. However, the present invention is not limited to this, and is also applicable to a film transfer apparatus capable of performing a foil transfer process called hot foil stamping, obtaining a very smooth varnished surface, finishing the varnished surface into a semi-gloss matte surface, or performing a hologram embossing process of transferring the pattern of a film onto the varnished surface.

In the above-mentioned embodiment, the unwinder device 18 is arranged vertically below the rewinder device 19. However, the vertical positional relationship between the unwinder device 18 and rewinder device 19 may be opposite to the above case, that is, the unwinder device 18 may be arranged vertically above the rewinder device 19. This means that the unwinder device 18 and rewinder device 19 need only be vertically aligned with each other.

In the above-mentioned embodiment, the photoelectric sensors PES1 to PES4 are arranged in the delivery-side suction chambers 131a to 131c at a predetermined interval, and the reflectors M1 to M4 are arranged in the feed-side suction chambers 121a to 121c to be opposed to the photoelectric sensors PES1 to PES4, respectively. However, the present invention is not limited to this, and the photoelectric sensors PES1 to PES4 may be arranged at almost the centers or lowermost ends of the delivery-side suction chambers 131a to 131c, and the reflectors M1 to M4 may be arranged in the feed-side suction chambers 121a to 121c to be opposed to the photoelectric sensors PES1 to PES4, respectively. The positions of the photoelectric sensors PES1 to PES4 and reflectors M1 to M4 can be set arbitrarily.

In place of the photoelectric sensors PES1 to PES5 used in the above-mentioned embodiment, various sensors such as laser sensors, proximity sensors, or ultrasound sensors can also be used.

In the above-mentioned embodiment, the three divided feed-side suction chambers 121a to 121c and three divided delivery-side suction chambers 131a to 131c individually undergo suction control. However, the present invention is not limited to this, and at least two divided feed-side suction chambers and at least two divided delivery-side suction chambers may individually undergo suction control.

In the above-mentioned embodiment, the computer 40 implements the variation rate calculation unit 321, variation width calculation unit 331, motor control unit 510, and suction force control unit 520. However, different computers may independently implement the variation rate calculation unit 321 and variation width calculation unit 331 included in the film storage state detection device 300, and the motor control unit 510 and suction force control unit 520 included in the control device 50.

The film transfer apparatus according to the present invention is applicable not only to a sheet-fed offset rotary film transfer apparatus but also to a web-fed film transfer apparatus.

What is claimed is:

1. A film transfer apparatus comprising:
   an unwinder device which rotatably supports an unwinding reel including a film wound therearound, and unwinds the film from the unwinding reel;
   a film storage unit which forms a U-shaped portion in the film supplied from said unwinder device and stores the film;
   a film transfer cylinder which is supported rotatably and presses the film delivered from said film storage unit against one of a sheet and a web; and
   a rewinder device which rotatably supports a rewinding reel, and rewinds around the rewinding reel the film transferred via said film transfer cylinder,
   wherein said film storage unit includes
   an air blow device which blows air toward a bottom portion of the U-shaped portion of the film
   an infeed roller which pulls the film stored in said film storage unit out of said film storage unit to transfer the film onto said film transfer cylinder,
   a suction film feed device disposed on a side on which the film is supplied from said unwinder device, and
   a suction film delivery device disposed on a side on which the film is delivered by said infeed roller, wherein said suction film feed device includes
a feed-side suction unit which includes a feed-side guide surface opposed to one side surface of the U-shaped portion of the film, and draws the one side surface by suction, and
a conveyor belt which is disposed between said feed-side suction unit and the one side surface of the U-shaped portion of the film, and transports a one-side surface portion of the U-shaped portion of the film, and
wherein said suction film delivery device includes
a delivery-side suction unit which includes a delivery-side guide surface opposed to the other side surface of the U-shaped portion of the film, and draws said other side surface by suction,
wherein an other side surface portion of the U-shaped portion of the film is pulled out of said film storage unit by only said infeed roller.

2. An apparatus according to claim 1, wherein
said feed-side suction unit includes
a downstream suction unit opposed to said delivery-side suction unit, and
an upstream suction unit which is provided upstream of said downstream suction unit in a direction in which the film is transported, and projects more to an upstream side, in the direction in which the film is transported, than said delivery-side suction unit.

3. An apparatus according to claim 1, wherein said film storage unit further includes a control device which controls suction forces of said feed-side suction unit and said delivery-side suction unit.

4. An apparatus according to claim 3, wherein said control device includes a suction force control unit which controls the suction forces of said feed-side suction unit and said delivery-side suction unit based on a width of the film.

5. An apparatus according to claim 3, wherein said control device includes a suction force control unit which controls the suction forces of said feed-side suction unit and said delivery-side suction unit based on a rotation speed of said film transfer cylinder.

6. An apparatus according to claim 3, further comprising:
a film storage state detection device which detects a storage state of the film in said film storage unit,
wherein said control device includes a suction force control unit which controls the suction forces of said feed-side suction unit and said delivery-side suction unit based on the detection result obtained by said film storage state detection device.

7. An apparatus according to claim 6, wherein
said film storage state detection device includes
a film position detection unit which detects a position of the bottom portion of the U-shaped portion of the film in said film storage unit, and
a variation width detection unit which obtains a variation width of the bottom portion of the U-shaped portion of the film based on the detection result obtained by said film position detection unit, and
said suction force control unit is adapted to control the suction forces of said feed-side suction unit and said delivery-side suction unit based on the variation width obtained by said variation width detection unit.

8. An apparatus according to claim 6, wherein
said film storage state detection device includes a variation rate detection unit which calculates an amount of film storage change per unit time as a variation rate of the film, based on an amount of unwinding of the film from the unwinding reel within a predetermined time, and an amount of delivery of the film from said film storage unit within the predetermined time, and
said suction force control unit is adapted to control the suction forces of said feed-side suction unit and said delivery-side suction unit based on the variation rate of the film calculated by said variation rate detection unit.

9. An apparatus according to claim 2, wherein
said downstream suction unit includes a plurality of feed-side suction chambers which are juxtaposed in a direction in which the film is transported, and are capable of individually adjusting their own suction forces, and
said delivery-side suction unit includes a plurality of delivery-side suction chambers which are juxtaposed in the direction in which the film is transported, and are capable of individually adjusting own suction forces.

10. An apparatus according to claim 9, further comprising:
a film position detection unit which detects a position of the bottom portion of the U-shaped portion of the film in said film storage unit; and
a suction force control unit which individually controls the suction forces of said plurality of feed-side suction chambers, and the suction forces of said plurality of delivery-side suction chambers, based on the detection result obtained by said film position detection unit.

11. An apparatus according to claim 10, wherein
said film position detection unit includes a plurality of photoelectric sensors juxtaposed in said film storage unit in a direction in which the film is transported.

12. An apparatus according to claim 1, wherein
said unwinder device includes an unwinding reel driving motor which rotates the unwinding reel, and
said film storage unit includes a control device which controls said unwinding reel driving motor.

13. An apparatus according to claim 12, further comprising:
a film position detection unit which detects a position of the bottom portion of the U-shaped portion in said film storage unit,
wherein said control device includes a motor control unit which controls said unwinding reel driving motor based on the detection result obtained by said film position detection unit.

14. The film transfer apparatus of claim 1,
wherein said film storage unit is disposed vertically above said film transfer cylinder, and
said unwinder device and said rewinder device are disposed vertically above said film storage unit and are vertically aligned with each other.

* * * * *